(12) United States Patent
Flamm et al.

(10) Patent No.: US 11,027,362 B2
(45) Date of Patent: Jun. 8, 2021

(54) SYSTEMS AND METHODS PROVIDING LOCATION FEEDBACK FOR ADDITIVE MANUFACTURING

(71) Applicant: LINCOLN GLOBAL, INC., Santa Fe Springs, CA (US)

(72) Inventors: Jason Kenneth Flamm, Fort Collins, CO (US); Steven R. Peters, Huntsburg, OH (US); William Thomas Matthews, Chesterland, OH (US); Paul Edward Denney, Northborough, MA (US); Jonathan Paul, Knoxville, TN (US); Levi Mitchell, Windsor, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 381 days.

(21) Appl. No.: 16/199,380

(22) Filed: Nov. 26, 2018

(65) Prior Publication Data

US 2019/0184486 A1    Jun. 20, 2019

Related U.S. Application Data

(60) Provisional application No. 62/607,598, filed on Dec. 19, 2017.

(51) Int. Cl.
*B23K 9/04* (2006.01)
*B33Y 10/00* (2015.01)
(Continued)

(52) U.S. Cl.
CPC ............ *B23K 11/253* (2013.01); *B23K 9/042* (2013.01); *B23K 9/0737* (2013.01); *B23K 9/125* (2013.01);
(Continued)

(58) Field of Classification Search
CPC .... B23K 11/253; B23K 11/258; B23K 9/042; B23K 9/173; B23K 11/314; B23K 9/125; B23K 9/126; B23K 9/0737
See application file for complete search history.

(56) References Cited

U.S. PATENT DOCUMENTS

| 1,740,381 A | 12/1929 | Weed |
| 1,792,243 A | 2/1931 | Richter |

(Continued)

FOREIGN PATENT DOCUMENTS

| CA | 2740615 | 12/2004 |
| CN | 101032778 | 9/2007 |

(Continued)

OTHER PUBLICATIONS

Machine translation of Japan Patent No. 2010-227,950, Feb. 2021.*
(Continued)

*Primary Examiner* — Geoffrey S Evans
(74) *Attorney, Agent, or Firm* — Perkins Coie LLP

(57) ABSTRACT

A system and method to correct for height error during a robotic additive manufacturing process. One or both of an output current, output voltage, output power, output circuit impedance and a wire feed speed are sampled during an additive manufacturing process when creating a current layer. A plurality of instantaneous contact tip-to-work distances (CTWD's) are determined based on at least one or both of the output current, output voltage, output power, output circuit impedance and the wire feed speed. An average CTWD is determined based on the plurality of instantaneous CTWD's. A correction factor is generated, based on at least the average CTWD, which is used to compensate for any error in height of the current layer.

28 Claims, 11 Drawing Sheets

(51) Int. Cl.
- *B23K 11/25* (2006.01)
- *B23K 9/173* (2006.01)
- *B23K 11/31* (2006.01)
- *B23K 9/12* (2006.01)
- *B23K 9/073* (2006.01)
- *B33Y 40/00* (2020.01)
- *B33Y 30/00* (2015.01)

(52) U.S. Cl.
CPC .............. *B23K 9/126* (2013.01); *B23K 9/173* (2013.01); *B23K 11/258* (2013.01); *B23K 11/314* (2013.01); *B33Y 10/00* (2014.12); *B33Y 30/00* (2014.12); *B33Y 40/00* (2014.12)

(56) References Cited

U.S. PATENT DOCUMENTS

| | | |
|---|---|---|
| 1,854,536 A | 4/1932 | Wilson |
| 1,878,829 A | 9/1932 | Crouch |
| 2,180,813 A | 11/1939 | Marvin |
| 2,280,223 A | 4/1942 | Dumpelmann |
| 2,620,423 A | 12/1952 | Momers |
| 2,669,640 A | 2/1954 | Outcalt |
| 2,694,129 A | 11/1954 | Yenni |
| 2,702,846 A | 2/1955 | Breymeier |
| 2,743,342 A | 4/1956 | Bettis |
| 2,756,311 A | 7/1956 | Persson |
| 2,773,969 A | 12/1956 | Gunther |
| 2,806,129 A | 9/1957 | Cape |
| 2,820,183 A | 1/1958 | Ander |
| 2,844,705 A | 7/1958 | Bowman |
| 2,920,183 A | 1/1960 | Greene |
| 2,994,763 A | 8/1961 | Schulz |
| 3,023,130 A | 2/1962 | Wasserman |
| 3,032,870 A | 5/1962 | Rohrberg |
| 3,102,946 A | 9/1963 | Zygmunt |
| 3,122,629 A | 2/1964 | Manz |
| 3,174,027 A | 3/1965 | Manz |
| 3,192,079 A | 6/1965 | Otomaro |
| 3,252,828 A | 5/1966 | Quaas |
| 3,274,371 A | 9/1966 | Manz |
| 3,329,487 A | 7/1967 | Sowko |
| 3,417,223 A | 12/1968 | Steigerwald |
| 3,433,924 A | 3/1969 | Sevenco |
| 3,483,354 A | 12/1969 | Manz |
| 3,551,637 A | 12/1970 | Lampson |
| 3,602,683 A | 8/1971 | Hishida |
| 3,620,830 A | 11/1971 | Kramer |
| 3,624,345 A | 11/1971 | Armstrong |
| 3,626,145 A | 12/1971 | Jackson |
| 3,627,974 A | 12/1971 | Normando |
| 3,704,358 A | 11/1972 | Saito |
| 3,727,822 A | 4/1973 | Umbaugh |
| 3,766,354 A | 10/1973 | Bierwith |
| 3,775,581 A | 11/1973 | Sciaky |
| 3,825,712 A | 7/1974 | Gibbs |
| 3,851,139 A | 11/1974 | Rudd |
| 3,885,123 A | 5/1975 | Sciaky |
| 3,924,092 A | 12/1975 | Lessmann et al. |
| 3,956,610 A | 5/1976 | Kanbe |
| 3,978,311 A | 8/1976 | Tolh |
| 3,993,889 A | 11/1976 | Sciaky |
| 4,019,011 A | 4/1977 | Cape |
| 4,019,016 A | 4/1977 | Friedman |
| 4,027,135 A | 5/1977 | Barger |
| 4,048,436 A | 9/1977 | Hiratake |
| 4,060,709 A | 11/1977 | Hanson |
| 4,095,077 A | 6/1978 | Schneider |
| 4,095,085 A | 6/1978 | Tomita |
| 4,145,593 A | 3/1979 | Merrick |
| 4,164,641 A | 8/1979 | Scheffels |
| 4,169,962 A | 10/1979 | Hiratake et al. |
| 4,190,760 A | 2/1980 | Kano |
| 4,194,106 A | 3/1980 | Rudaz |
| 4,214,141 A | 7/1980 | Okuda |
| 4,215,299 A | 7/1980 | Edwin |
| 4,280,137 A | 7/1981 | Ashida |
| 4,286,026 A | 8/1981 | Cook |
| 4,301,355 A | 11/1981 | Kimbrough |
| 4,326,155 A | 4/1982 | Griebeier |
| 4,336,441 A | 6/1982 | Godai |
| 4,366,362 A | 12/1982 | Ohta |
| 4,396,822 A | 8/1983 | Kishida |
| 4,408,114 A | 10/1983 | Nakata |
| 4,409,465 A | 10/1983 | Yamamoto |
| 4,417,126 A | 11/1983 | Kasahara |
| 4,436,982 A | 3/1984 | Kokura |
| 4,441,012 A | 4/1984 | Risbeck |
| 4,456,813 A | 6/1984 | Mizuno |
| 4,456,814 A | 6/1984 | Mizuno |
| 4,467,176 A | 8/1984 | Takaji |
| 4,485,292 A | 11/1984 | Mizuno |
| 4,491,718 A | 1/1985 | Cook |
| 4,507,541 A | 3/1985 | Fourre |
| 4,511,784 A | 4/1985 | Miyamori |
| 4,525,619 A | 6/1985 | Ide et al. |
| 4,546,230 A | 10/1985 | Sasaki |
| 4,546,234 A | 10/1985 | Ogasawara |
| 4,547,654 A | 10/1985 | Stol |
| 4,580,026 A | 4/1986 | Stol |
| 4,590,358 A | 5/1986 | Stol |
| 4,595,820 A | 6/1986 | Richardson |
| 4,614,856 A | 9/1986 | Hori et al. |
| 4,628,182 A | 12/1986 | Hori |
| 4,650,722 A | 3/1987 | Brown |
| 4,663,513 A | 5/1987 | Webber |
| 4,683,368 A | 7/1987 | Das |
| 4,697,062 A | 9/1987 | Awano |
| 4,699,848 A | 10/1987 | Maybon |
| 4,717,818 A | 1/1988 | Broockman et al. |
| 4,737,612 A | 4/1988 | Bruck |
| 4,788,412 A | 11/1988 | Hori |
| 4,791,270 A | 12/1988 | Nelson |
| 4,801,781 A | 1/1989 | Hori |
| 4,803,334 A | 2/1989 | Burke |
| 4,866,247 A | 9/1989 | Parks |
| 4,868,649 A | 9/1989 | Gaudin |
| 4,904,843 A | 2/1990 | Hori |
| 4,954,691 A | 9/1990 | Parks |
| 4,972,064 A | 11/1990 | Stava |
| 4,975,558 A | 12/1990 | Lukens |
| 4,990,743 A | 2/1991 | Kugai |
| 5,040,125 A | 8/1991 | Okumura |
| 5,043,554 A | 8/1991 | Kohsaka |
| 5,124,527 A | 6/1992 | Takano |
| 5,130,514 A | 7/1992 | Kugai |
| 5,148,001 A | 9/1992 | Stava |
| 5,171,966 A | 12/1992 | Fukuoka |
| 5,206,474 A | 4/1993 | Fukuoka et al. |
| 5,219,425 A | 6/1993 | Nishikawa |
| 5,227,601 A | 7/1993 | Black |
| 5,233,158 A | 8/1993 | Karakama |
| 5,250,355 A | 10/1993 | Newman |
| 5,278,390 A | 1/1994 | Blankenship |
| 5,343,016 A | 8/1994 | Davis |
| 5,406,052 A | 4/1995 | Mizuno et al. |
| 5,473,139 A | 12/1995 | Matsui |
| 5,508,493 A | 4/1996 | Ueyama |
| 5,571,431 A | 11/1996 | Lantieri |
| 5,686,002 A | 11/1997 | Flood |
| 5,714,735 A | 2/1998 | Offer |
| 5,726,419 A | 3/1998 | Tabata et al. |
| 5,793,009 A | 8/1998 | Offer |
| 5,932,121 A | 8/1999 | Manabe |
| 5,958,261 A | 9/1999 | Offer |
| 5,994,659 A | 11/1999 | Offer |
| 6,023,043 A | 2/2000 | Manabe |
| 6,034,343 A | 3/2000 | Hashimoto |
| 6,037,554 A | 3/2000 | Innami |
| 6,051,810 A | 4/2000 | Stava |
| 6,087,619 A | 7/2000 | Berkmanns |
| 6,093,906 A | 7/2000 | Nicholson et al. |
| 6,127,644 A | 10/2000 | Singh |
| 6,127,651 A | 10/2000 | Burgoon |

(56) References Cited

U.S. PATENT DOCUMENTS

| | | |
|---|---|---|
| 6,191,379 B1 | 2/2001 | Offer |
| 6,207,929 B1 | 3/2001 | Stava |
| 6,310,320 B1 | 10/2001 | Kraus |
| 6,331,694 B1 | 12/2001 | Blankenship |
| 6,335,511 B1 | 1/2002 | Rothermel |
| 6,336,583 B1 * | 1/2002 | Wang ............... B23K 33/00 228/175 |
| 6,337,455 B1 | 1/2002 | Yamaguchi |
| 6,342,688 B1 | 1/2002 | Israel |
| 6,498,321 B1 | 12/2002 | Fulmer |
| 6,513,728 B1 | 2/2003 | Hughes |
| 6,521,861 B2 | 2/2003 | Jones |
| 6,617,547 B1 | 9/2003 | Abdurachmanov |
| 6,621,049 B2 | 9/2003 | Suzuki |
| 6,657,163 B1 | 12/2003 | Blankenship |
| 6,710,297 B1 | 3/2004 | Artelsmair |
| 6,781,083 B1 | 8/2004 | Keller |
| 6,800,832 B2 | 10/2004 | Hutchison et al. |
| 6,884,959 B2 | 4/2005 | Gandy |
| 6,989,507 B2 | 1/2006 | Clark |
| 7,005,607 B2 | 2/2006 | Takatani |
| 7,041,937 B2 | 5/2006 | Inde et al. |
| 7,109,439 B2 | 9/2006 | Stava |
| 7,307,240 B2 | 12/2007 | Holverson |
| 7,378,612 B2 | 5/2008 | Takahashi et al. |
| 7,408,130 B2 | 8/2008 | Sonoda |
| 7,842,900 B2 | 11/2010 | Longfield |
| 7,842,904 B2 | 11/2010 | Nakata et al. |
| 8,063,340 B2 | 11/2011 | Hu |
| 8,242,406 B2 | 8/2012 | Schreiber et al. |
| 8,253,062 B2 | 8/2012 | Forrest |
| 8,536,483 B2 | 9/2013 | Thomas |
| 8,653,417 B2 | 2/2014 | Peters |
| 8,791,384 B2 | 7/2014 | Wang |
| 9,044,817 B2 | 6/2015 | Fukunaga et al. |
| 9,085,041 B2 | 7/2015 | Peters |
| 9,203,893 B2 | 12/2015 | Cole |
| 9,987,707 B2 | 6/2018 | Dong et al. |
| 10,113,981 B2 | 10/2018 | Mitchell |
| 10,545,480 B2 | 1/2020 | Spieker et al. |
| 10,682,717 B2 | 6/2020 | Daniel et al. |
| 2002/0117485 A1 | 8/2002 | Jones |
| 2002/0117489 A1 | 8/2002 | Arndt |
| 2003/0024916 A1 | 2/2003 | Wright |
| 2003/0125118 A1 | 7/2003 | Raghavan |
| 2003/0136768 A1 | 7/2003 | Sonoda |
| 2004/0026388 A1 | 2/2004 | Staufer |
| 2004/0074884 A1 | 4/2004 | Butler |
| 2004/0118826 A1 | 6/2004 | Schmitt |
| 2005/0016974 A1 | 1/2005 | Myers |
| 2005/0199593 A1 | 9/2005 | Ignatchenko |
| 2005/0211687 A1 | 9/2005 | Sonoda |
| 2005/0269306 A1 | 12/2005 | Fulmer |
| 2006/0237409 A1 | 10/2006 | Uecker |
| 2006/0289394 A1 | 12/2006 | Revel |
| 2007/0056942 A1 | 3/2007 | Daniel et al. |
| 2007/0119829 A1 | 5/2007 | Vietz |
| 2007/0158324 A1 | 7/2007 | O'Donnell |
| 2007/0164007 A1 | 7/2007 | Peters |
| 2007/0194087 A1 | 8/2007 | Ogborn |
| 2007/0210042 A1 | 9/2007 | Forrest |
| 2007/0210048 A1 | 9/2007 | Koshiishi |
| 2007/0235429 A1 | 10/2007 | Revel |
| 2007/0241087 A1 | 10/2007 | Peters |
| 2007/0251927 A1 | 11/2007 | Miessbacher |
| 2007/0262058 A1 | 11/2007 | Ulrich |
| 2007/0267396 A1 | 11/2007 | Oskarsson |
| 2008/0006612 A1 | 1/2008 | Peters |
| 2008/0011727 A1 | 1/2008 | Peters |
| 2008/0053978 A1 | 3/2008 | Peters |
| 2008/0128395 A1 | 6/2008 | Aigner |
| 2008/0156782 A1 | 7/2008 | Rice |
| 2008/0206594 A1 | 8/2008 | Fukuda |
| 2008/0230528 A1 | 9/2008 | Wilhelm |
| 2008/0245774 A1 | 10/2008 | Kim |
| 2008/0257870 A1 | 10/2008 | Longfield |
| 2008/0296271 A1 | 12/2008 | Klein |
| 2009/0230099 A1 | 9/2009 | Aalto |
| 2009/0242533 A1 | 10/2009 | Yamazaki |
| 2010/0059485 A1 | 3/2010 | Hutchison |
| 2010/0059493 A1 | 3/2010 | Mcaninch |
| 2010/0096373 A1 | 4/2010 | Hillen |
| 2010/0096375 A1 | 4/2010 | Daniel |
| 2010/0176109 A1 | 7/2010 | Peters |
| 2010/0200553 A1 | 8/2010 | Yamazaki |
| 2010/0206856 A1 | 8/2010 | Tanaka |
| 2010/0213179 A1 | 8/2010 | Peters |
| 2010/0230389 A1 | 9/2010 | Hsu |
| 2010/0320174 A1 | 12/2010 | Hybinette |
| 2010/0326969 A1 | 12/2010 | Tsukamoto |
| 2011/0019331 A1 | 1/2011 | DuBose |
| 2011/0100965 A1 | 5/2011 | Yano |
| 2011/0132877 A1 | 6/2011 | Miller |
| 2011/0132878 A1 | 6/2011 | Wang |
| 2011/0174784 A1 | 7/2011 | Kamei |
| 2011/0259853 A1 | 10/2011 | Yamazaki |
| 2011/0284666 A1 | 11/2011 | Sugiyama |
| 2011/0290771 A1 | 12/2011 | Fukunaga |
| 2011/0297658 A1 | 12/2011 | Peters |
| 2011/0309062 A1 | 12/2011 | O'Donnell et al. |
| 2012/0024828 A1 | 2/2012 | Oowaki |
| 2012/0074112 A1 | 3/2012 | Kotera |
| 2012/0074114 A1 | 3/2012 | Kawamoto |
| 2012/0152916 A1 | 6/2012 | Oowaki |
| 2012/0298642 A1 | 11/2012 | Lambert |
| 2012/0312795 A1 | 12/2012 | Suzuki |
| 2013/0020289 A1 | 1/2013 | Peters |
| 2013/0043219 A1 | 2/2013 | Peters |
| 2013/0068744 A1 | 3/2013 | Matsui |
| 2013/0092667 A1 | 4/2013 | Peters |
| 2013/0112675 A1 | 5/2013 | Peters |
| 2013/0125685 A1 | 5/2013 | Miller |
| 2013/0146566 A1 | 6/2013 | Peters |
| 2013/0193115 A1 | 8/2013 | Berg |
| 2013/0213942 A1 | 8/2013 | Peters |
| 2013/0228555 A1 | 9/2013 | Peters |
| 2013/0309000 A1 | 11/2013 | Lin |
| 2013/0327749 A1 | 12/2013 | Denney |
| 2014/0021187 A1 | 1/2014 | Denney |
| 2014/0042129 A1 | 2/2014 | Daniel |
| 2014/0116994 A1 | 5/2014 | Peters |
| 2014/0209577 A1 | 7/2014 | Bruck |
| 2014/0312020 A1 * | 10/2014 | Daniel ............... B23K 9/173 219/124.02 |
| 2015/0014283 A1 | 1/2015 | Peters |
| 2015/0090703 A1 | 4/2015 | Peters |
| 2015/0108096 A1 * | 4/2015 | Daniel ............... B23K 9/044 219/76.12 |
| 2015/0129560 A1 | 5/2015 | Muramatsu |
| 2015/0151375 A1 | 6/2015 | Peters |
| 2015/0158105 A1 | 6/2015 | Peters |
| 2015/0158108 A1 | 6/2015 | Latessa et al. |
| 2015/0183044 A1 | 7/2015 | Peters |
| 2015/0183045 A1 | 7/2015 | Peters |
| 2015/0209908 A1 | 7/2015 | Peters et al. |
| 2015/0273612 A1 | 10/2015 | Peters |
| 2015/0379894 A1 | 12/2015 | Becker |
| 2017/0252847 A1 | 9/2017 | Daniel et al. |
| 2018/0141149 A1 * | 5/2018 | Hutchison ............ B23K 9/0956 |
| 2018/0290235 A1 | 10/2018 | Webster et al. |
| 2019/0270139 A1 | 9/2019 | Wuest et al. |
| 2019/0337079 A1 | 11/2019 | Zhang et al. |

FOREIGN PATENT DOCUMENTS

| | | |
|---|---|---|
| CN | 102133679 | 7/2011 |
| CN | 102186618 | 9/2011 |
| DE | 2501928 | 1/1975 |
| DE | 2545075 | 10/1975 |
| DE | 4412093 | 10/1995 |
| DE | 102006050297 | 4/2008 |
| DE | 102007017225 | 9/2008 |
| EP | 0304855 | 8/1988 |
| EP | D664181 | 7/1995 |

(56) References Cited

FOREIGN PATENT DOCUMENTS

| | | |
|---|---|---|
| EP | 1027951 | 8/2000 |
| EP | 1384546 | 1/2004 |
| EP | 1454703 | 9/2006 |
| EP | 1920864 | 5/2008 |
| EP | 2380691 | 10/2011 |
| GB | 1332506 | 10/1973 |
| GB | 1400051 | 7/1975 |
| GB | 2273109 | 6/1994 |
| JP | 55077992 | 6/1980 |
| JP | 5739077 | 3/1982 |
| JP | 58-3784 | 1/1983 |
| JP | 58-205680 | 11/1983 |
| JP | 59-87981 | 5/1984 |
| JP | 59223168 | 12/1984 |
| JP | 62-207583 | 9/1987 |
| JP | 63-13672 | 1/1988 |
| JP | 63-192562 | 8/1988 |
| JP | 2-59179 | 2/1990 |
| JP | 299286 | 4/1990 |
| JP | 4182071 | 6/1992 |
| JP | 7009173 | 1/1995 |
| JP | 8132231 | 5/1996 |
| JP | 09-201687 | 8/1997 |
| JP | 10-193116 | 7/1998 |
| JP | 11-291038 | 10/1999 |
| JP | 2001-198689 | 7/2001 |
| JP | 2001-276971 | 10/2001 |
| JP | 2002239731 | 8/2002 |
| JP | 2003333721 | 11/2003 |
| JP | 2004-209515 | 7/2004 |
| JP | 2004-237326 | 8/2004 |
| JP | 2004-330299 | 11/2004 |
| JP | 2006-26724 | 2/2006 |
| JP | 2009012028 A * | 1/2009 |
| JP | 2010227950 | 10/2010 |
| JP | 2010227950 A * | 10/2010 |
| JP | 2011-020175 | 2/2011 |
| JP | 2011-031257 | 2/2011 |
| JP | 2011-50998 | 3/2011 |
| JP | 2011-062278 | 3/2011 |
| JP | 2011098375 | 5/2011 |
| JP | 2012-30262 | 2/2012 |
| JP | 2012-030263 | 2/2012 |
| KR | 20040034774 | 4/2004 |
| SU | 538842 | 12/1976 |
| SU | 1637971 | 3/1991 |
| WO | WO 2007132362 | 11/2007 |
| WO | WO 2008140398 | 11/2008 |
| WO | WO 2010082081 | 7/2010 |
| WO | WO 2010141435 | 12/2010 |
| WO | 2011/027238 A1 | 3/2011 |
| WO | WO 2013150364 | 10/2013 |
| WO | WO 2014009800 | 1/2014 |
| WO | WO 2014013322 | 1/2014 |

OTHER PUBLICATIONS

International Application No. PCT/IB2015/000197, International Search Report & Written Opinion, pp. 18, dated Oct. 7, 2015.
International Application No. PCT/IB2015/000206, International Search Report & Written Opinion, pp. 12, dated Aug. 3, 2015.
International Application No. PCT/IB2015/000216, International Search Report & Written Opinion, pp. 11, dated Jul. 31, 2015.
International Application No. PCT/IB2015/000202, International Search Report & Written Opinion, pp. 13, dated Jul. 30, 2015.
International Application No. PCT/IB2015/000201, International Search Report & Written Opinion, pp. 11, dated Jul. 29, 2015.
International Application No. PCT/IB2015/000199, International Search Report & Written Opinion, pp. 11, dated Jul. 29, 2015.
International Application No. PCT/IB2015/000227, International Search Report & Written Opinion, pp. 10, dated Jul. 7, 2015.
International Application No. PCT/IB2015/000089, International Search Report & Written Opinion, pp. 10, dated Jul. 23, 2015.
International Application No. PCT/IB2015/002706, International Search Report & Written Opinion, pp. 7, dated Jun. 18, 2015.
International Application No. PCT/IB2015/000208, International Search Report & Written Opinion, pp. 11, dated Jun. 10, 2015.
International Application No. PCT/IB2014/001494, International Search Report & Written Opinion, pp. 10, dated Feb. 25, 2015.
International Application No. PCT/IB2009/007882, International Search Report & Written Opinion, pp. 09, dated May 11, 2010.
International Application No. PCT/IB2012/001597, International Search Report & Written Opinion, pp. 08, dated Jan. 3, 2013.
International Application No. PCT/IB2013/001510, International Search Report & Written Opinion, pp. 10, dated Jan. 7, 2014.
International Application No. PCT/IB2013/001568, International Search Report & Written Opinion, pp. 20, dated May 14, 2014.
International Application No. PCT/IB2013/002706, International Search Report & Written Opinion, pp. 10, dated May 22, 2014.
International Application No. PCT/IB2014/000105, International Search Report & Written Opinion, pp. 03, dated Jul. 15, 2014.
International Application No. PCT/IB2014/000335, International Search Report & Written Opinion, pp. 09, dated Oct. 2, 2014.
International Application No. PCT/IB2014/000421, International Search Report & Written Opinion, pp. 04, dated Oct. 1, 2014.
Digital Communications Improves Productivity,Quality and Safety, NX-1.20, Mar. 2006, www.lincolnelectric.com.pp.
Power Wave 445M Robotic & Power Wave 445/STT Robotic, Publication E10.90 Apr. 2003, www.lincolnelectric.com, pp. 1-8.
Schnick, et al. "Three dimensional modeling of arc behavior and gas shield quality in tandem gas-metal arc welding using anit-phase pulse synchronization." Journal of Physics D: Applied Physics, 44 (2011) 185205, 11 pages, Dec. 2011.
International Application No. PCT/IB2013/000583, International Search Report & Written Opinion, pp. 09, dated Sep. 20, 2013.
International Application No. PCT/IB2014/000283, International Search Report & Written Opinion, pp. 05, dated Sep. 4, 2014.
International Application No. PCT/IB2014/000376, International Search Report & Written Opinion, pp. 09, dated Sep. 24, 2014.
International Application No. PCT/IB2014/000383, International Search Report & Written Opinion, pp. 09, dated Sep. 24, 2014.
International Application No. PCT/IB2013/001365, International Search Report & Written Opinion, pp. 11, dated Dec. 17, 2013.
International Application No. PCT/IB2013/001384, International Search Report & Written Opinion, pp. 09, dated Nov. 26, 2013.
Henon, Barbara K et al., "Automated Narrow Gap GTAW—Driving Down The Cost of Energy," Arc Machines, Inc. pp. 3, prior to Jun. 27, 2012.
International Application No. PCT/IB2013/001464, International Search Report & Written Opinion, pp. 09, dated Dec. 5, 2013.
Machine translation of Japan Patent Document No. 2003-333,721, Jun. 2016.
Machine translation of Japan Patent Document No. 2012-030,263, Jun. 2016.
The Lincoln Electric Company, Product Brochure for Power Wave 455M Robotic & Power Wave 455M/STT Robotic Publication No. E10.90. pp. 8, Apr. 2003.
Extended European Search Report from Corresponding Application No. 18214205.9; dated May 13, 2019; pp. 1-8.

* cited by examiner

SYSTEMS AND METHODS PROVIDING LOCATION FEEDBACK FOR ADDITIVE MANUFACTURING

PRIORITY

This U.S. patent application claims the benefit of and priority to U.S. provisional patent application Ser. No. 62/607,598 filed on Dec. 19, 2017, which is incorporated herein by reference in its entirety.

TECHNICAL FIELD

Certain embodiments of the present invention relate to additive manufacturing. More particularly, certain embodiments of the present invention relate to systems and methods providing location feedback for additive manufacturing processes that can using welding, cladding or hot wire processes, and can be used with robotic systems.

BACKGROUND

During an additive manufacturing process, successive layers of metal material are build up to create a workpiece part. A robotic welding unit can used to build-up the workpiece part, layer-by-layer, over time as commanded by a robot controller of the robotic welding unit. The robot controller may include software that reads a 3D model of the workpiece part to be created using an additive (layer-by-layer) manufacturing process. The robot controller programmatically splits the 3D model into a plurality of layers and plans a welding path for each of the individual layers to perform the build-up of the part. An expected deposition is determined for each layer, resulting in an expected height for each deposited layer. However, as actual layer-by-layer deposition proceeds, the actual resultant height for any given layer may deviate from the expected or desired height, due to factors such as, for example, surface conditions of the workpiece part substrate (e.g., temperature or position on substrate) and the accuracy with which certain welding parameters can be controlled.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

A system and method to correct for height error during an additive manufacturing process are provided. One or both of an output current and a wire feed speed are sampled during an additive manufacturing process when creating a current layer. A plurality of instantaneous contact tip-to-work distances (CTWD's) are determined based on at least one or each of the output current, the wire feed speed, a circuit impedance, an output voltage and an output power. An average CTWD is determined based on the plurality of instantaneous CTWD's. A correction factor is generated, based on at least the average CTWD, which is used to compensate for any error in height of the current layer and/or the next layer.

In one embodiment, an additive manufacturing system is provided having a power source. The power source is configured to sample, in real time, instantaneous parameter pairs during an additive manufacturing process while creating a current layer of a 3D workpiece part. Each instantaneous parameter pair of the instantaneous parameter pairs can include an output current, a wire feed speed, an output voltage, a circuit impedance and an output power. At least one of the power source or a separate system controller is also configured to determine an instantaneous contact tip-to-work distance in real time for, and based on at least, each parameter pair of the instantaneous parameter pairs as each parameter pair is sampled during creation of the current layer. The power source and/or a separate system controller is further configured to determine, in real time, a running average contact tip-to-work distance based on each instantaneous contact tip-to-work distance as each instantaneous contact tip-to-work distance is determined during creation of the current layer. Either one, or both of the power source or system controller is also configured to generate a correction factor. The correction factor is based on at least the running average contact tip-to-work distance and is to be used in real time, while creating the current layer of the 3D workpiece part, to compensate for deviations in a deposit level from a desired deposit level for the current layer. In one embodiment, the instantaneous contact tip-to-work distance may further be based on one or more of an output voltage, an electrode type, an electrode diameter, a shielding gas used, or a deposition process used. The running average contact tip-to-work distance may be one of a simple running mathematical average or a weighted average of the instantaneous contact tip-to-work distances. In one embodiment, the power source is configured to generate the correction factor at least in part by comparing the running average contact tip-to-work distance to a setpoint contact tip-to-work distance. The power source and/or system controller may also be configured to adjust, in real time, one or more of a travel speed, a duration, or a wire feed speed of the system during creation of the current layer in response to the correction factor. Adjusting the travel speed in response to the correction factor may include taking into account a preset travel speed. Adjusting the deposition process duration in response to the correction factor may include taking into account a preset process duration. Adjusting the wire feed speed in response to the correction factor may include taking into account a preset wire feed speed. In one embodiment, the correction factor is further based on one or more 3D model parameters corresponding to the 3D workpiece part or robot parameters provided by a robot controller for a current deposition operation for the current layer. The 3D model parameters and robot parameters may include one or more of a designated height of the current layer or a designated position of a deposition tool for the current layer. In one embodiment, the deposition system includes a robot having a robot controller configured to operatively communicate with the power source. In one embodiment, the deposition system includes a deposition tool operatively connected to the robot. In one embodiment, the system includes a wire feeder operatively connected to the tool and the power source.

In one embodiment, a material deposition system is provided having a deposition power source. The deposition power source is configured to sample, in real time, instantaneous parameter pairs during a material deposition additive manufacturing process while creating a current layer of a 3D workpiece part. Each instantaneous parameter pair of the instantaneous parameter pairs can include any two of an output current, an output voltage, a circuit impedance, a power output and a wire feed speed. The power source is also configured to determine an instantaneous contact tip-to-work distance in real time for, and based on at least, each parameter pair of the instantaneous parameter pairs as each parameter pair is sampled during creation of the current layer. The power source is further configured to determine, in real time, a running average contact tip-to-work distance based on each instantaneous contact tip-to-work distance as each instantaneous contact tip-to-work distance is determined during creation of the current layer. The power source is also configured to determine a total average contact tip-to-work distance based on each instantaneous contact tip-to-work distance determined over the entire current layer. The power source is further configured to adjust, in real time, one or more of a process duration, a travel speed, or a wire feed speed of the system during creation of the current layer in response to the running average contact tip-to-work distance. The power source is also configured to generate a correction factor to be used when creating a next layer of the 3D workpiece part based on at least the total average contact tip-to-work distance. In accordance with one embodiment, the power source includes a controller configured to determine the instantaneous contact tip-to-work distance, determine the running average contact tip-to-work distance, determine the total average contact tip-to-work distance, adjust one or more of the process duration, the travel speed, or the wire feed speed during the creation of the current layer, and generate the correction factor to be used when creating the next layer. In other exemplary embodiments, the deposition system uses a system controller, which can be external from, but coupled to, the deposition power source, but controls at least some operation of the power source. In one embodiment, the instantaneous contact tip-to-work distance is further based on one or more of an output voltage, an electrode type, an electrode diameter, a shielding gas used, or a deposition process used. In one embodiment, adjusting the travel speed in response to the running average contact tip-to-work distance includes taking into account a preset travel speed. Adjusting the process duration in response to the running average contact tip-to-work distance includes taking into account a preset process duration. Adjusting the wire feed speed in response to the running average contact tip-to-work distance includes taking into account a preset wire feed speed. In one embodiment, the correction factor is further based on one or more of 3D model parameters corresponding to the 3D workpiece part or robot parameters provided by a robot controller for a next process operation for the next layer. The 3D model parameters and the robot parameters may include one or more of a designated height of the next layer or a designated position of a deposition tool for the next layer. The total average contact tip-to-work distance is one of a simple mathematical average of the instantaneous contact tip-to-work distances determined over the entire current layer, a weighted average of the instantaneous contact tip-to-work distances determined over the entire current layer, or a running average of the instantaneous contact tip-to-work distances determined over the entire current layer. In one embodiment, the system includes a robot having a robot controller configured to operatively communicate with the power source, a deposition tool operatively connected to the robot, and a wire feeder operatively connected to the tool and the power source.

Details of illustrated embodiments of the present invention will be more fully understood from the following description and drawings.

DETAILED DESCRIPTION

Figure 1:
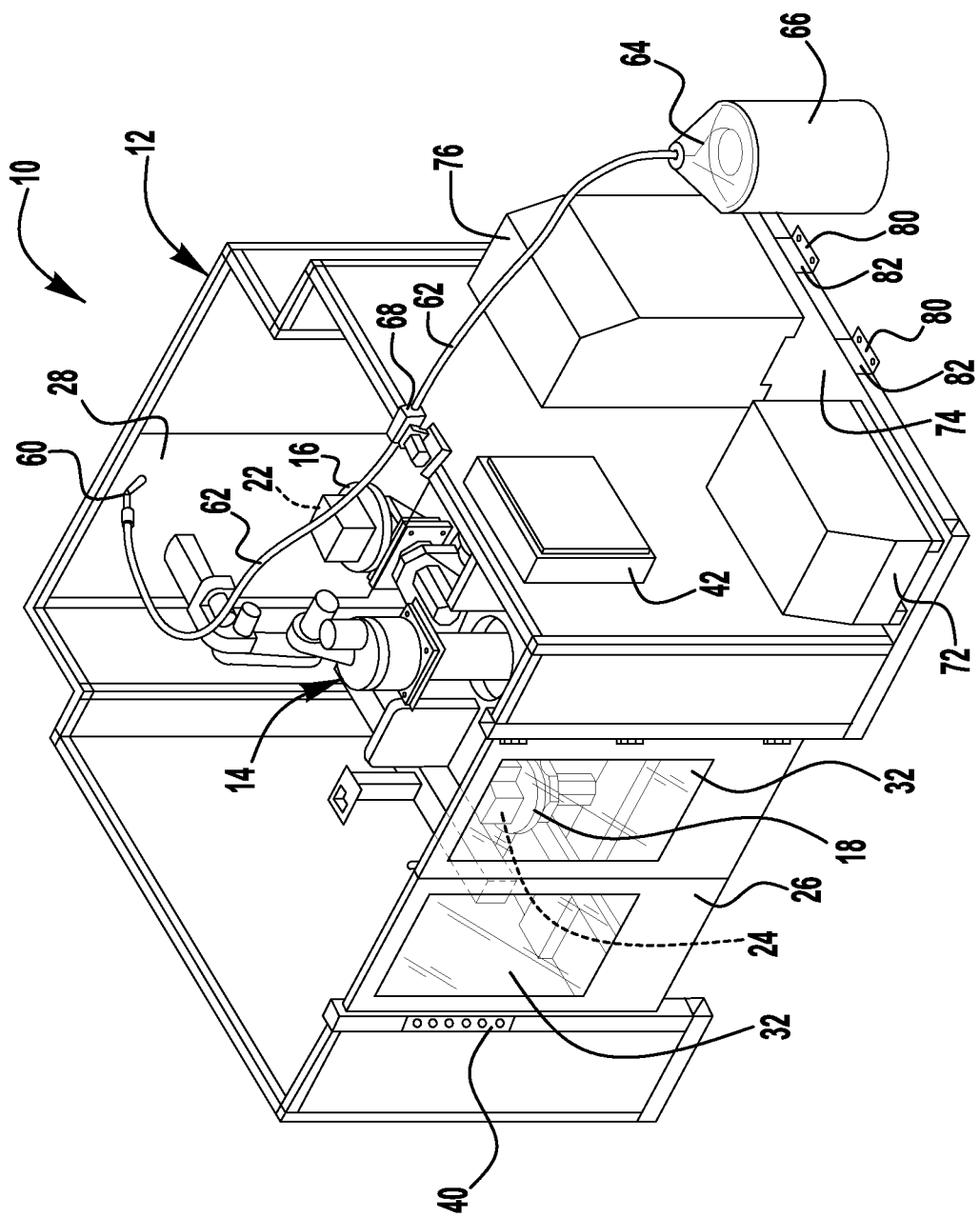
FIG. 1 illustrates a diagram of an exemplary embodiment of a robotic cell unit.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Deposition tool", as used herein, refers to, but is not limited to, a gun, a torch, or any device that accepts a consumable, such as a wire, sheet, etc., that can be used in any one or more of a welding, hot-wire, cladding, or other material deposition process for the purpose of applying electrical power to the consumable provided by a power source.

"Deposition output circuit path", as used herein, refers to the electrical path from a first side of the output of a deposition power source, through a first cable (or a first side of a cable), to an electrode, to a workpiece (either through a short, an arc, or direct sustained contact, between the electrode and the workpiece), through a second cable (or a second side of a cable), and back to a second side of the output of the deposition power source.

"Cable", as used herein, refers to the electrical cable that may be connected between a deposition power source and an electrode and workpiece (e.g. through a wire feeder) to provide electrical power to pass current from the electrode to the workpiece, whether it be by an arc, a short, or sustained direct contact between the electrode and the workpiece.

"Deposition output", as used herein, may refer to the electrical output circuitry or output port or terminals of a deposition power source, or to the electrical power, voltage, or current provided by the electrical output circuitry or output port of a deposition power source.

"Computer memory", as used herein, refers to a storage device configured to store digital data or information which can be retrieved by a computer or processing element.

"Controller", as used herein, refers to the logic circuitry and/or processing elements and associated software or program involved in controlling a deposition power source, a material deposition system or a robot, and as constructed consistent with known controllers, for example including a processor, or the like.

The terms "signal", "data", and "information" may be used interchangeably herein and may be in digital or analog form.

The term "process parameter" is used broadly herein and may refer to characteristics of a portion of an output current waveform (e.g., amplitude, pulse width or duration, slope, electrode polarity), a material deposition process (e.g., a short arc welding process, a hot wire process, a cladding process, a pulse welding process, etc.), wire feed speed, a modulation frequency, or a welding travel speed.

With reference to FIG. 1, a robotic cell unit 10 generally includes a frame 12, a robot 14 disposed within the frame, and a table 16 also disposed within the frame. The robotic cell unit 10 is useful for building up a workpiece part 22 on a substrate through an additive manufacturing process, as described in more detail below herein. It is noted that while FIG. 1 and some of the other figures discussed herein reference, and or show, a "welding" system, embodiments of the present invention are not so limited. That is, embodiments of the present invention can be used in other types of material deposition processes, including hot-wire and cladding processes. Because of the overall system similarities between these systems they need not be show separately and the figures discussed herein, along with the discussions below, can equally apply to any and all of these types of material deposition processes. For example, either one of a hot wire cell unit or cladding cell unit would be similar in construction and operation to the system shown in FIG. 1. Therefore, the discussions herein regarding or referencing a "welding" cell or system are inclusive of and exemplary with respect to other deposition processes. Accordingly, in the interests of efficiency and brevity, similar discussions and descriptions will not be repeated with respect to these other types if material deposition processes as those of ordinary skill in the art will readily understand the applicability of discussions herein to these other material deposition processes.

In the depicted embodiment, the frame 12 includes a plurality of side walls and doors to enclose the robot 14 and the table 16. Even though a substantially rectangular configuration is shown in a plan view, the frame 12, and the unit 10, can take numerous configurations.

A front access door 26 mounts to the frame 12 to provide access to the interior of the frame. Similarly, a rear access door 28 also mounts to the frame 12. Windows 32 can be provided on either door (only depicted on front door 26). The windows can include a tinted safety screen, which is known in the art.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the unit 10 in a similar manner to controls used with known cell units.

In accordance with an embodiment, the robot 14 is mounted on a pedestal that mounts on a support (not shown). The robot 14 used in the depicted embodiment can be an ARC Mate® 100/Be robot available from FANUC Robotics America, Inc. Other similar robots can also be used. The robot 14 in the depicted embodiment is positioned with respect to the table 16 and includes eleven axes of movement. If desired, the pedestal (not shown) can rotate with respect to the support (not shown) similar to a turret. Accordingly, some sort of drive mechanism, e.g. a motor and transmission (not shown), can be housed in the pedestal and/or the support for rotating the robot 14.

A gun 60 attaches to a distal end of the robot arm 14. The gun 60 can be similar to welding guns that are known in the art (and can also be a material deposition gun for other processes as discussed herein). A flexible tube or conduit 62 attaches to the gun 60. Consumable electrode wire 64, which can be stored in a container 66, is delivered to the gun 60 through the conduit 62. A wire feeder 68, which can be a PF 10 R-II wire feeder available from The Lincoln Electric Company for example, attaches to the frame 12 to facilitate the delivery of wire 64 to the gun 60.

Even though the robot 14 is shown mounted to a base or lower portion of the frame 12, if desired, the robot 14 can mount in a similar manner as the robot disclosed in U.S. Pat. No. 6,772,932. That is, the robot can mount to an upper structure of the frame and extend downwardly into the cell unit 10.

With reference back to the embodiment depicted in FIG. 1, a power source 72 for the deposition operation mounts to and rests on a platform 74 that is connected to and can be a part of the frame 12. The power source 72 in the depicted embodiment is a PW 455 M (non STT) available from The Lincoln Electric Company; however, other suitable power sources can be used for the operation. A robot controller 76, which controls the robot 14, also rests and mounts on the platform 74. The robot controller typically accompanies the robot 14. The power source 72 can be any one of a welding, hot-wire, cladding or other material deposition power source as referenced herein, depending on the material deposition process being used.

The robotic cell unit 10 may also include a shielding gas supply (not shown). During operation, the wire feeder 68, the gun 60, the shielding gas supply, and the power source 72 are operatively connected to allow an electric arc to be created between a consumable wire and a workpiece part 22 to create a deposited layer as is well known in the art. Of course, in other embodiments an arc may not be used, such as in hot-wire processes. In accordance with an embodiment, shielding gases may be used during a gas metal arc welding (GMAW) process to protect the welding region from atmospheric gases such as oxygen or nitrogen, for example. Such atmospheric gases may cause various weld metal defects such as, for example, fusion defects, embrittlement, and porosity.

The type of shielding gas, or combination of shielding gases used depend on the material being welded and the welding process. The rate of flow of the shielding gas to be provided depends on the type of shielding gas, the travel speed, the welding current, the weld geometry, and the metal transfer mode of the welding process. Inert shielding gases include argon and helium. However, there may be situations when it is desirable to use other shielding gases or combinations of gases such as, for example, carbon dioxide (CO2) and oxygen. In accordance with an embodiment, a shielding gas may be fed to a welding tool during an arc welding process such that the welding tool disperses the shielding gas to the weld region during the welding process.

Selection of a consumable wire or electrode is dependent on the composition of the workpiece part being additively manufactured, the deposition process, the configuration of the layer, and the surface conditions of the workpiece part substrate. Consumable wire selection may largely affect the mechanical properties of the resultant layers and may be a main determinant of layer quality. It may be desirable for the resultant metal layers to have mechanical properties like those of the base substrate material, without defects such as discontinuities, contaminants, or porosity.

Existing consumable wire electrodes often contain deoxidizing metals such as silicon, manganese, titanium, and aluminum in relatively small percentages to help prevent oxygen porosity. Some electrodes may contain metals such as titanium and zirconium to avoid nitrogen porosity. Depending on the process and base substrate material being deposited upon, the diameters of the electrodes used in gas metal arc welding (GMAW) typically range from 0.028-0.095 inches, but may be as large as 0.16 inches. The smallest electrodes, generally up to 0.045 inches in diameter, may be associated with a short-circuit metal transfer process, while electrodes used for spray-transfer processes may be at least 0.035 inches in diameter. Of course, other deposition processes, such as hot-wire, cladding, etc. can use consumables having different compositions, sizes and shapes and embodiments of the present invention are not so limited. For example, hot wire consumables can have components that cannot normally be transferred via an arc, such as tungsten carbide, etc.

It is noted, that while not shown, the system 10 can also include other systems/components such as a laser, etc. As generally known, lasers can be used in hot-wire, welding and or cladding operations, and thus the system 10 can include a laser. Because systems and processes that use a laser for the deposition process those system need not be described in detail herein.

Figure 2:
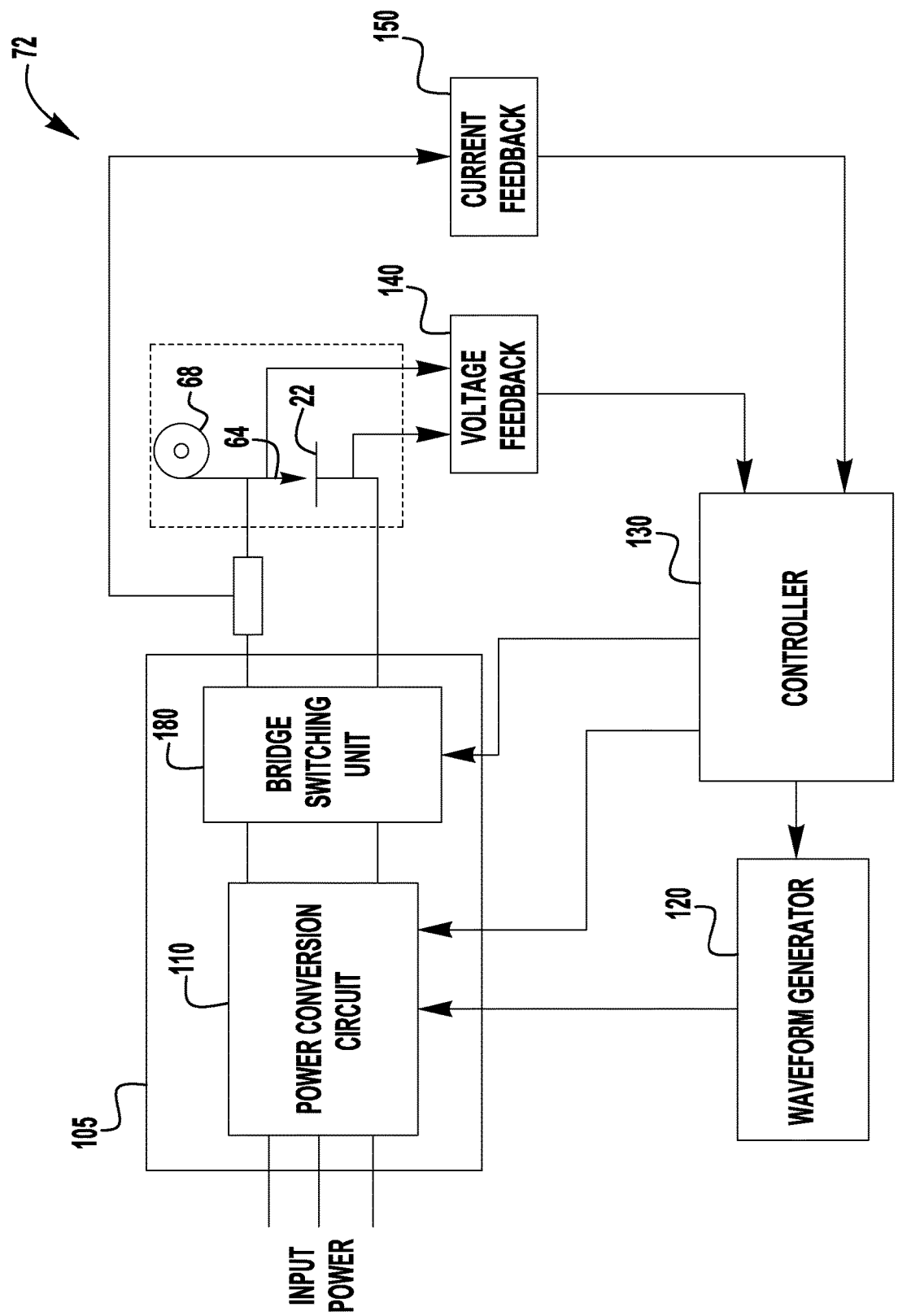
FIG. 2 illustrates a schematic block diagram of an exemplary embodiment of the power source of the robotic cell unit of FIG. 1 operatively connected to a consumable electrode and a workpiece part.

FIG. 2 illustrates a schematic block diagram of an exemplary embodiment of the power source 72 of the robotic cell unit 10 of FIG. 1 operatively connected to a consumable electrode 64 and a workpiece part 22. As noted above, the power source 72 can be a welding power source (as described in the following exemplary description), or can be a hot-wire, cladding or other type of material deposition power source. As is generally understood and known, these power sources for these other types of material processes have a similar construction and operation as shown and described with respect to FIG. 2. Accordingly, the following discussion equally applies to embodiments which do not use a welding process. The power source 72 includes a switching power supply 105 having a power conversion circuit 110 and a bridge switching circuit 180 providing output power between the electrode 64 and the workpiece part 22. The power conversion circuit 110 may be transformer based with a half bridge output topology. For example, the power conversion circuit 110 may be of an inverter type that includes an input power side and an output power side, for example, as delineated by the primary and secondary sides, respectively, of an output transformer. Other types of power conversion circuits are possible as well such as, for example, a chopper type having a DC output topology. The power supply 105 also includes a bridge switching circuit 180 that is operatively connected to the power conversion circuit 110 and is configured to switch a direction of the polarity of the output current (e.g., for AC welding).

The power source 72 further includes a waveform generator 120 and a controller 130. The waveform generator 120 generates output waveforms at the command of the controller 130. A waveform generated by the waveform generator 120 modulates the output of the power conversion circuit 110 to produce the output current between the electrode 64 and the workpiece part 22. The controller 130 also commands the switching of the bridge switching circuit 180 and may provide control commands to the power conversion circuit 110.

The power source 72 further includes a voltage feedback circuit 140 and a current feedback circuit 150 to monitor the output voltage and current between the electrode 64 and the workpiece part 22 (and/or the voltage and current passing through the electrode/workpiece when depositing without an arc) and provide the monitored voltage and current back to the controller 130. The feedback voltage and current may be used by the controller 130 to make decisions with respect to modifying the output waveform generated by the waveform generator 120 and/or to make other decisions that affect operation of the power source 72, for example. In accordance with an embodiment, the controller 130 is used to determine CTWD during a deposition process, and use the CTWD to adjust a time duration (WTD) and/or a wire feed speed (WFS), as is discussed in more detail later herein. Further, while the controller 130, can be positioned within the power source 72 in some embodiments, the controller 130 can be separate from the power source 72 but coupled to the power source 72 (for example coupled to another controller within the power source 72). The operation of the controller 130, as described herein, would be similar, but embodiments are not limited to having the controller 130 within the power source.

In accordance with an embodiment, the switching power supply 105, the waveform generator 120, the controller 130, the voltage feedback circuit 140, and the current feedback circuit 150 constitute the power source 72. The robotic cell unit 10 also includes a wire feeder 68 that feeds the consumable wire electrode 64 toward the workpiece part 22 through the deposition gun (e.g., hot-wire, cladding or welding tool) 60 at a selected wire feed speed (WFS). The wire feeder 68, the consumable electrode 64, and the workpiece part 22 are not part of the power source 72 but may be operatively connected to the power source 72 via one or more output cables. Again, in some embodiments the controller 130 can be separate from the power source 72, but in communication with the power source 72.

Figure 3:
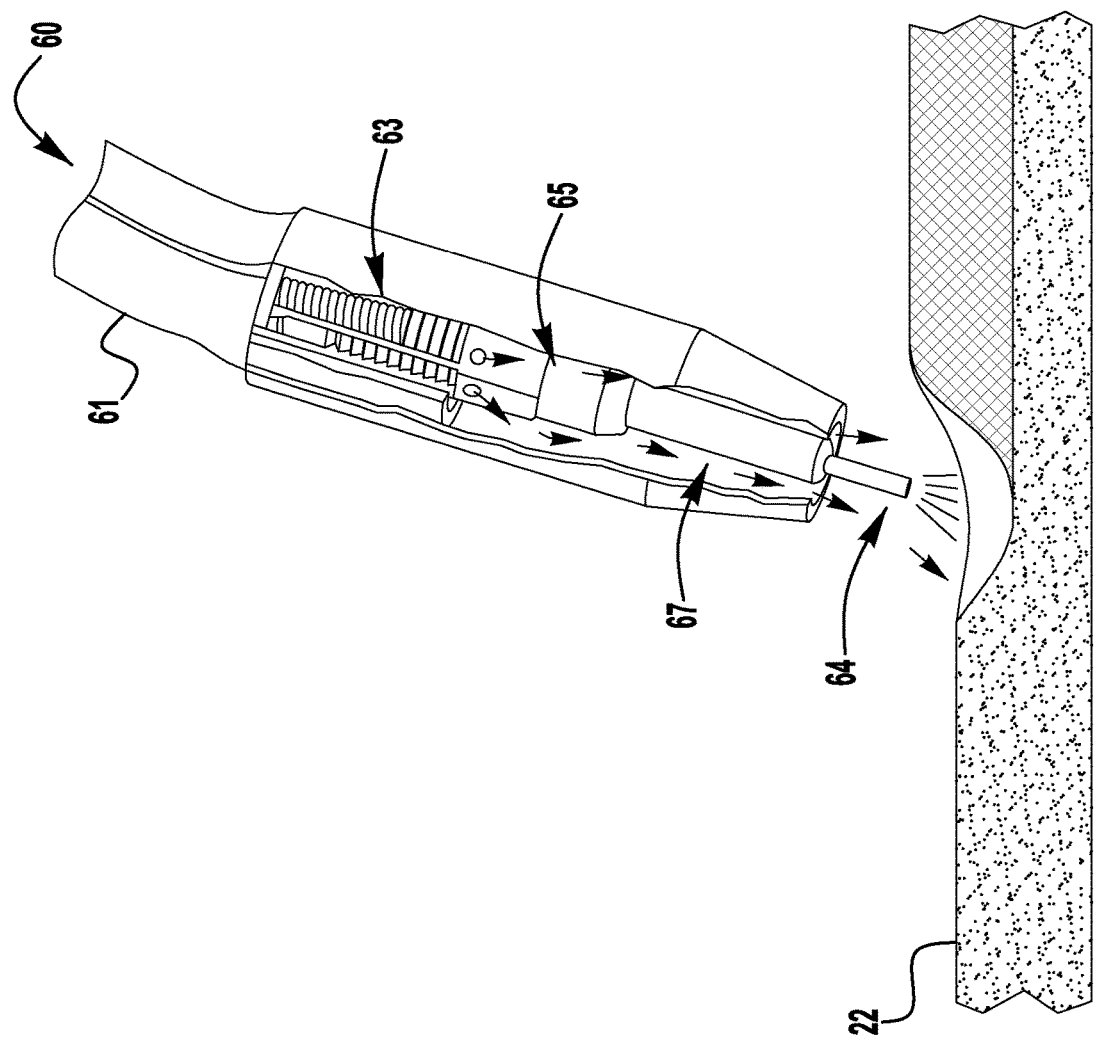
FIG. 3 illustrates a diagram of an exemplary embodiment of a portion of the gun of the robotic cell unit of FIG. 1 providing a wire electrode that interacts with a workpiece part during an additive manufacturing process.

FIG. 3 illustrates a diagram of an exemplary embodiment of a portion of the welding/deposition gun 60 of the robotic cell unit 10 of FIG. 1 providing an electrode 64 that interacts with a workpiece part 22 during an additive manufacturing process. The gun 60 may have an insulated conductor tube 61, an electrode conduit 63, a gas diffuser 65, a contact tip 67, and a wire electrode 64 feeding through the gun 60. A control switch, or trigger, (not shown) when activated by the robot 14, starts the wire feed, electric power, and the shielding gas flow (if needed), causing an electric arc to be established between the electrode 64 and the workpiece part 22 (in an arc welding or arc deposition process). The contact tip 67 is electrically conductive and is connected to the power source 72 through a cable and transmits electrical energy to the electrode 64 while directing the electrode 64 toward the workpiece part 22. The contact tip 67 is secured and sized to allow the electrode 64 to pass while maintaining electrical contact. Of course, similar configurations can be used in non-arc deposition processes, where no arc is used in the process.

The wire feeder 68 supplies the electrode 64 to the workpiece part 22, driving the electrode 64 through the conduit 62 and on to the contact tip 67. The wire electrode 64 may be fed at a constant feed rate, or the feed rate may be varied based on the arc length and the welding voltage. Some wire feeders can reach feed rates as high as 1200 in/min), however, feed rates for semiautomatic GMAW typically range from 75-400 in/min.

On the way to the contact tip 67, the wire electrode 64 is protected and guided by the electrode conduit 63, which helps prevent kinking and maintains an uninterrupted feeding of the wire electrode 64. The gas diffuser 65 directs the shielding gas evenly into the welding zone. A gas hose from the tank(s) of shielding gas supplies the gas to the gas diffuser 65—if needed.

With respect to FIG. 3, the construction of the gun shown can be similar for cladding and/or hot-wire deposition processes. However, of course, in non-arc deposition processes (e.g., hot-wire) the consumable 64 is in direct contact with the puddle on the workpiece and not as depicted (above the puddle). Because hot-wire deposition is generally known, it need not be described in detail herein.

Figure 4B:
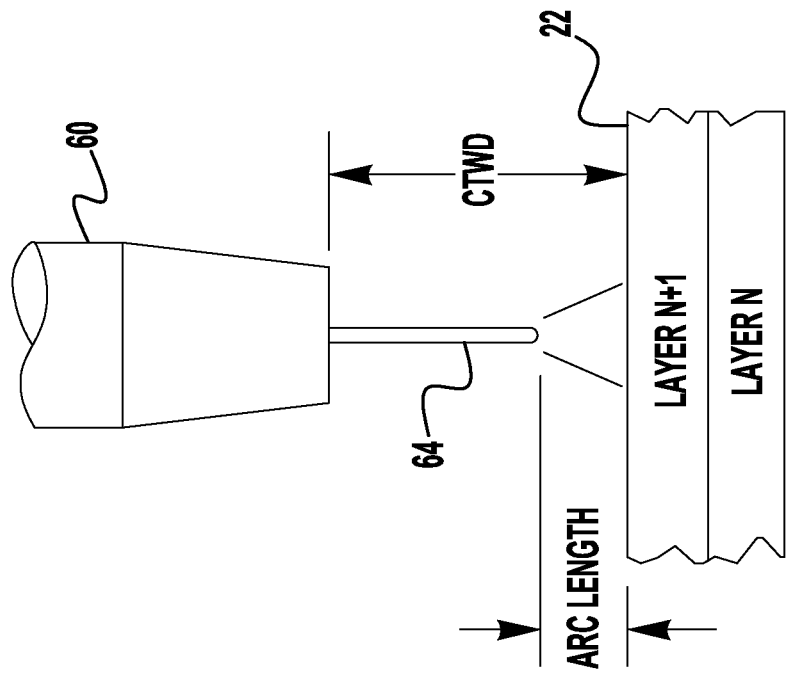
FIGS. 4A and 4B illustrate the concept of contact tip-to-work distance (CTWD) with and without the presence of an arc.
Figure 4A:
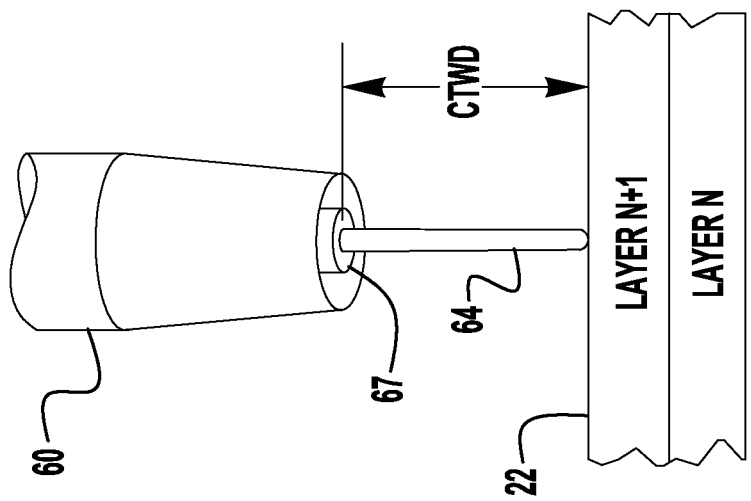

FIGS. 4A and 4B illustrate the concept of contact tip-to-work distance (CTWD) with and without the presence of an arc. In FIG. 4A, the CTWD is shown as the distance between the end of the contact tip 67 and a top layer of the workpiece part 22 with no arc established between the electrode 64 and the workpiece part 22. This CTWD can be used in non-arc material deposition systems, such as hot-wire, and other non-arc deposition processes. In FIG. 4B, the CTWD is shown as the distance between the end of the contact tip 67 and the top layer of the workpiece part 22 with an arc established between the electrode 64 and the workpiece part 22. Again, keeping a consistent, desired contact tip-to-work distance (CTWD) during a deposition process is important. In general, as CTWD increases, the process current decreases. A CTWD that is too long may cause the electrode to get too hot and may also waste shielding gas (in a welding process). Furthermore, the desired CTWD may be different for different deposition processes.

In accordance with an embodiment, the workpiece part 22 is built up, layer-by-layer, over time as commanded by the robot controller 76. The robot controller 76 includes software that reads a 3D model of the workpiece part 22 to be created using an additive (layer-by-layer) manufacturing process. The robot controller 76 programmatically splits the 3D model into a plurality of layers and plans a deposition path for each of the individual layers to perform the build-up of the part 22. An expected deposition is determined for each layer, resulting in an expected height for each deposited layer. However, as actual layer-by-layer build proceeds, the actual resultant height for any given layer may deviate from the expected or desired height, due to factors such as, for example, surface conditions of the workpiece part substrate and the accuracy with which certain parameters can be controlled. Therefore, in accordance with an embodiment, CTWD is monitored for each layer during the deposition process and used to compensate for errors in the height dimension as described below herein in detail.

Figure 5:
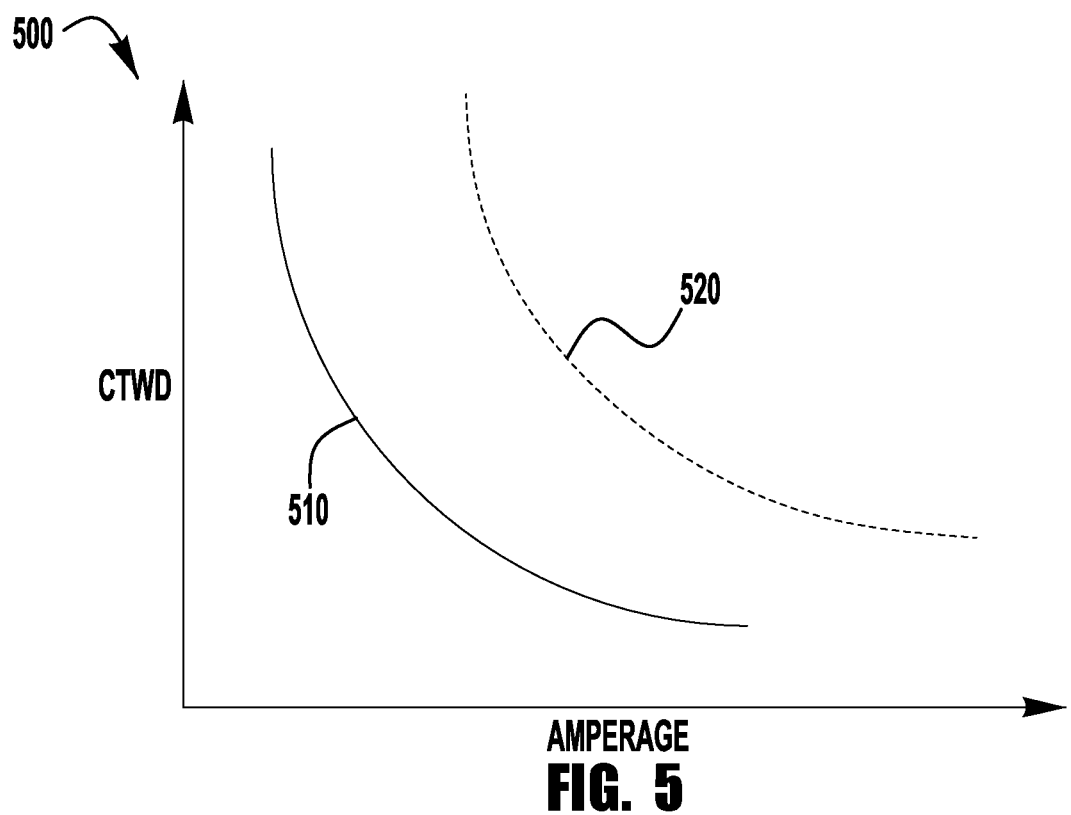
FIG. 5 illustrates an exemplary embodiment of a two-dimensional graph having two plots showing the relationship between CTWD and welding output current (amperage) for two different welding wires, being of the same type but of two different sizes, for an arc welding process at a given wire feed speed when a particular type of welding gas is used.

FIG. 5 illustrates an exemplary embodiment of a two-dimensional graph 500 having two plots 510 and 520 showing the relationship between CTWD and output current (amperage) for two different consumable wires, being of the same type and fed at the same fixed rate, but being of two different diameters, for an arc welding process when a particular type of welding gas is used. Of course, these graphs can be similarly generated for other different types of processes described herein, including cladding processes, hot-wire processes, etc., where the graphs are generated for various other parameters/relationships, and not just for two different diameters. These graphs are merely exemplary. In accordance with an embodiment, the actual instantaneous CTWD during a deposition process may be determined in real time by the controller 130 based on the output current (amperage), the electrode type, the electrode diameter, the wire feed speed (WFS), the shielding gas used (if used), and the deposition process used (e.g., hot-wire, cladding, GMAW, GTAW, etc.). As the CTWD changes in real time during a deposition process, the output current (amperage) will reflect that change in real time, as defined by the appropriate plot (e.g., 510 or 520). As the actual CTWD changes in real time during the deposition process, the controller 130, receiving the output current value fed back from the current feedback circuit 150, and already knowing the selected wire electrode type/diameter, shielding gas mixture, and wire feed speed, determines the actual CTWD. Of course, in other exemplary embodiments, the graph/comparison can use other parameters instead of current. For example, in other exemplary embodiments the CTWD relationship can be compared with output current, output power and/or output circuit impedance. The comparisons can be plotted similarly to that shown in FIG. 5. That is, in some deposition processes it may be more advantageous to use a different parameter feedback instead of current (amperage). For example, in a hot wire process it may be more advantageous to use output power and/or output circuit impedance due to the sensitivity of these parameters during the respective process. Therefore, exemplary embodiments are not limited to using amperage v. CTWD, but can also use power v. CTWD, voltage v. CTWD, and/or impedance v. CTWD. Again, the graphs/plots can be similarly constructed to that shown in FIG. 5.

In accordance with an embodiment, plot 510 corresponds to a wire electrode, having a diameter of 0.045 inches and being of a mild steel, copper coated type, used in a welding process providing a mixture of 90% argon shielding gas and 10% carbon dioxide shielding gas. Furthermore, in accordance with an embodiment, plot 520 corresponds to a wire electrode, having a diameter of 0.052 inches and being of a same mild steel, copper coated type, used in a welding process providing a same mixture of 90% argon shielding gas and 10% carbon dioxide shielding gas. As can be seen from FIG. 5, as the diameter of the welding wire of the same type is changed to an increased diameter, the plot representing the relationship of CTWD vs. amperage moves outward from the origin of the graph 500.

In accordance with various embodiments, the relationship between CTWD and amperage (and/or CTWD v. voltage, power or impedance) for a combination of electrode type, electrode diameter, wire feed speed, shielding gas used (for arc type processes), and the deposition process may be determined experimentally or through analysis based on theory. Once such a relationship is determined, the relationship may be expressed or stored in the controller 130 as a look-up-table (LUT) or as a mathematical transfer function or algorithm, for example.

Figure 6:
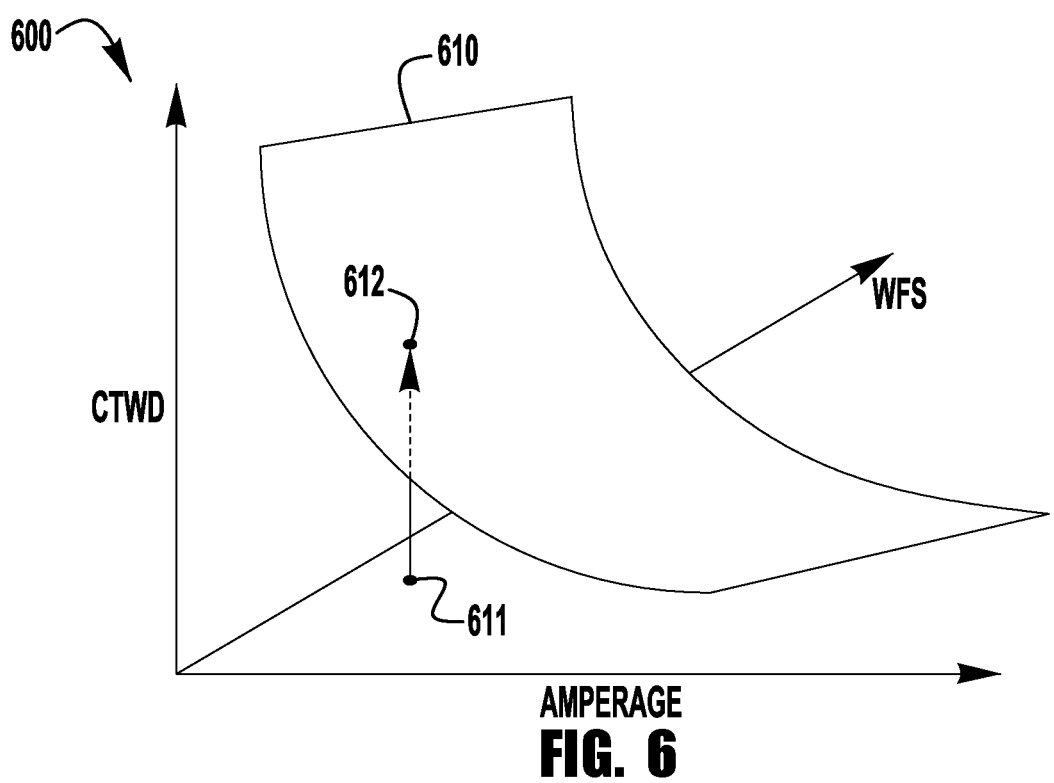
FIG. 6 illustrates an exemplary embodiment of a three-dimensional graph showing the relationship between CTWD, welding output current (amperage), and wire feed speed, being of a particular type and size, for an arc welding process when a particular type of welding gas is provided.

In accordance with an alternative embodiment, the wire feed speed (WFS) may vary during the deposition process (e.g., based on the arc length and the output voltage) and, therefore, the LUT or mathematical transfer function may reflect the effect of a changing wire feed speed on CTWD. For example, FIG. 6 illustrates an exemplary embodiment of a three-dimensional graph 600 showing the relationship between CTWD, output current (amperage), and wire feed speed (WFS) for a consumable wire, being of a particular type and size, for an arc welding process when a particular type of gas is provided. The plot 610 on the graph 600 forms a surface. In accordance with an embodiment, the actual instantaneous CTWD during a deposition process may be determined in real time by the controller 130 based on the output current (amperage), the wire feed speed, the electrode type, the electrode diameter, the shielding gas used (if used), and the process type. Again, like FIG. 5, the three dimensional graph of FIG. 6 can also be generated/created for comparing CTWD to voltage, power and circuit impedance. That is, as with FIG. 5, maintaining CTWD in different processes (such as hot-wire, cladding, GTAW, etc.) may be optimized by using a comparison of CTWD to anyone or a combination of current, voltage, power and circuit impedance. Therefore, the depiction of current, as shown in FIG. 6, is again exemplary and other embodiments can use other process parameters similarly to that discussed herein, without departing from the spirit or scope of the present invention.

Thus, in an exemplary embodiment, as the actual CTWD changes in real time during a deposition process, the paired output current (amperage) and WFS (parameter pair) will reflect that change in real time, as defined by the surface plot 610 of the graph 600. Again, in other embodiments, the power voltage or circuit impedance could be part of the pair with the WFS. Furthermore, as the actual CTWD changes in real time during the deposition process, the controller 130, receiving the output current (amperage) value fed back from the current feedback circuit 150 and the WFS value fed back from the wire feeder 68, and already knowing the selected wire electrode type/diameter and shielding gas mixture, determines the actual CTWD. FIG. 6 shows an example of an amperage/WFS parameter pair 611 corresponding to an actual CTWD value 612 as determined by the surface plot 610 of the graph 600. For other combinations of electrode type, electrode diameter, shielding gas used, process type, etc., plots of other surfaces will define the relationship of CTWD, WFS, and amperage (or voltage, power or impedance). In accordance with an alternative embodiment, taking into consideration the output voltage as fed back to the controller 130 from the voltage feedback circuit 140 may provide a more accurate determination of actual instantaneous CTWD, depending on the process. Further, in other exemplary embodiments, at least one or both of the feedback circuits 150 and 140 can be used by the system/controller 130 to determine the power and/or output circuit impedance, to then be used in a graph similar to that shown in FIGS. 5 and/or 6. As the determination of output power and circuit impedance in system such as those described herein are well known, they need not be described in detail herein. Again, depending on the deposition process being used it may be more advantageous, due to system sensitivity or CTWD sensitivity to the parameter being determined, to use any one of or a combination of current, voltage, power and circuit impedance with CTWD.

In accordance with various embodiments, the relationship between CTWD, WFS, and amperage, voltage, power or circuit impedance, for a combination of electrode type, electrode diameter, shielding gas used, and process type process type may be determined experimentally or through analysis based on theory. Once such a relationship is determined, the relationship may be expressed or stored in the controller 130 as a look-up-table (LUT) or as a mathematical transfer function expressed in software, for example.

Figure 7:
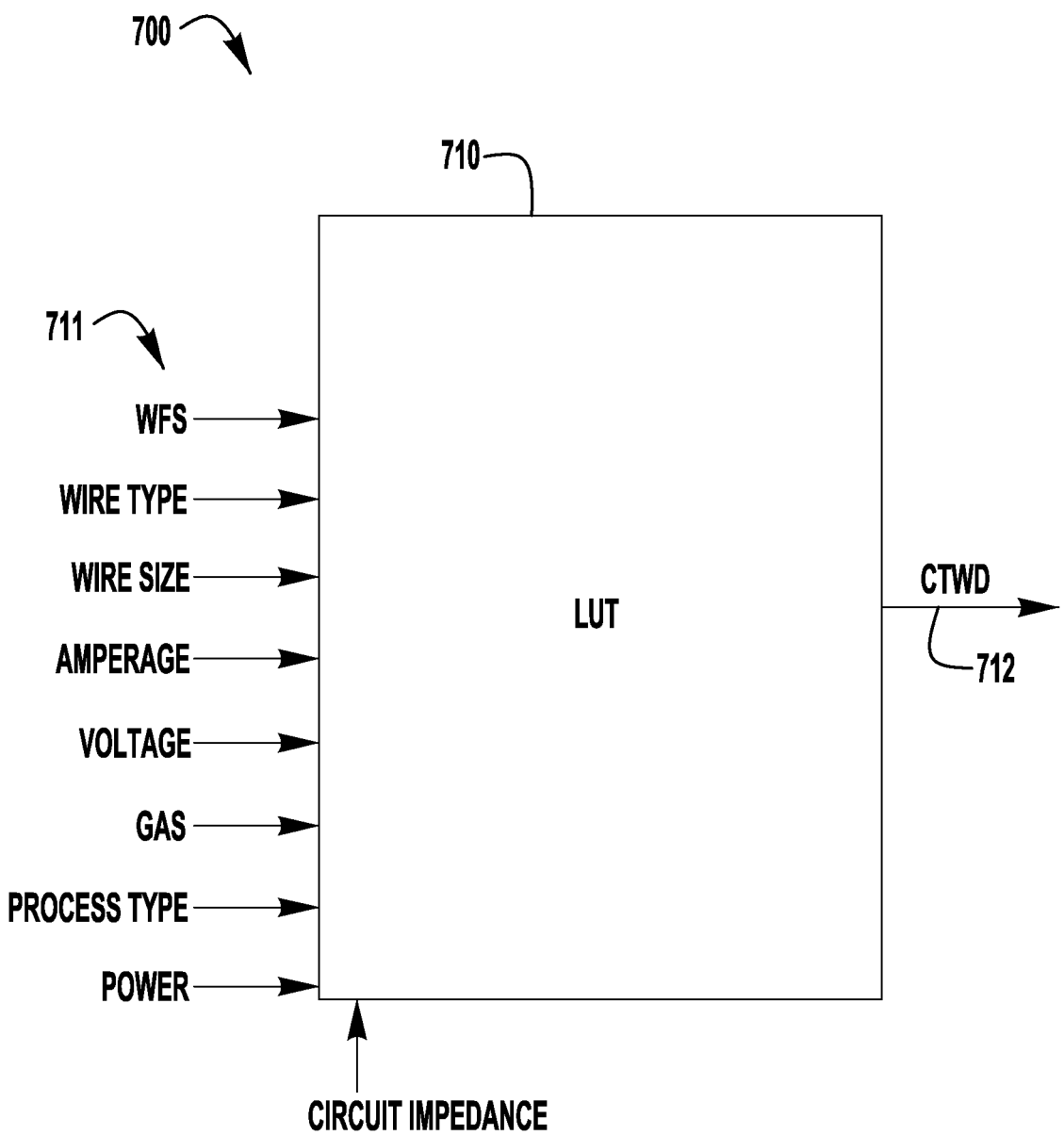
FIG. 7 illustrates an exemplary embodiment of a portion of the controller of the power source of FIG. 2 configured to determine an actual, instantaneous CTWD.

FIG. 7 illustrates an exemplary embodiment of a portion 700 of the controller 130 of the power source 72 of FIG. 2 configured to determine an actual, instantaneous CTWD. As shown in the embodiment of FIG. 7, a LUT 710 is used to implement the relationship between the inputs 711 (WFS, wire type, wire size, amperage, voltage, shielding gas, and process type) and the output 712 (actual CTWD). The LUT 710 may be implemented in firmware, for example, as an EEPROM. In some embodiments, the inputs of output voltage, process type or shielding gas may not be used. For any particular combination of inputs 711, an output 712 representing an actual and instantaneous CTWD, in real time, is produced. Of course, other inputs 711 can be used to achieve a desired performance without departing from the spirit or scope of the present invention. Again, the controller 130 can be internal to the power supply 72, but can also be located in a separate controller/computer used to control the operation of the system. As discussed herein, further inputs 711 can include output power and circuit impedance, which can be provided from feedback circuits or other sources. However, in other embodiments, the power and/or impedance can be determined in the LUT by using at least the voltage and current values.

Figure 8:
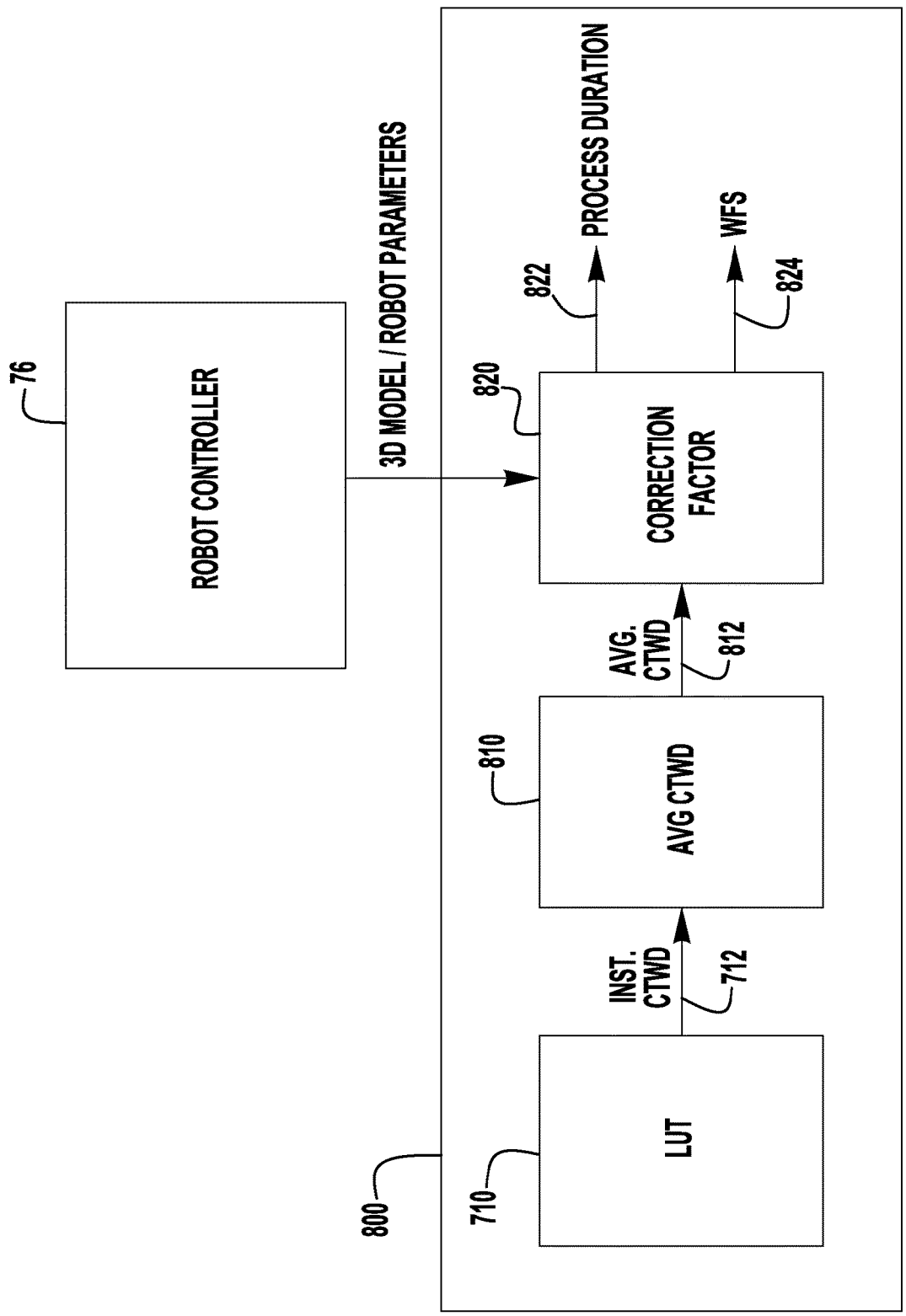
FIG. 8 illustrates an exemplary embodiment of a portion of the controller of the power source of FIG. 2 configured to determine an average CTWD over time, from the instantaneous CTWD's, and compute a correction factor.

FIG. 8 illustrates an exemplary embodiment of a portion 800 of the controller 130 of the power source 72 of FIG. 2 configured to determine an average CTWD 812 over time, from the CTWD's 712 out of the LUT 710, and compute a correction factor. The correction factor can take the form of a process duration 822, a wire feed speed (WFS) 824, or both. FIG. 8 also shows the robot controller 76 communicatively interfacing to the portion 800 of the controller 130 of the power source 72. Optionally or alternatively, the correction factor can take the form of a travel speed of the deposition gun.

In accordance with an embodiment, when a current deposition operation is being performed to create a current layer at a current position on the workpiece part 22, a plurality of instantaneous CTWD's 712 is determined during the current deposition operation and an average CTWD 812 is computed from the plurality of instantaneous CTWD's 712 for the current layer by an averaging module 810. A correction factor (e.g., duration 822, WFS 824, or both) for a next deposition operation is computed by a correction factor module 820 based on the average CTWD 812 and further based on 3D model/robot parameters corresponding to the next deposition operation which are received by the controller 130 from the robot controller 76. The correction factor is used by the power source 72 to generate the next layer at the next workpiece part position (e.g., the next height position corresponding to the next layer) during the next deposition operation.

In accordance with an embodiment, the average CTWD can be a simple mathematical average of the instantaneous CTWD's. In another embodiment, the average CTWD can be a weighted average. For example, more weight may be given to the later instantaneous CTWD's (e.g., maybe the last four of the ten). In accordance with still another embodiment, the average CTWD can be a running average, where the total number of samples of instantaneous CTWD's may vary from layer to layer. Other ways of determining average CTWD that work well for different additive manufacturing applications may be possible as well. Therefore, the term "average CTWD" is used in a broad sense herein.

In accordance with an embodiment, the 3D model/robot parameters may include one or more of a designated height of the next layer and a designated position of the gun 60. By knowing the 3D model/robot parameters for the next layer and the average CTWD from the current layer, the duration and/or the WFS can be increased or decreased for the next operation to generate the next layer. The averaging module 810 and the correction factor module 820 may be implemented as software and/or hardware in the controller 130, in accordance with various embodiments. For example, implementations as software running on a processor, or as firmware (e.g., a programmed EEPROM), are contemplated. Other implemented embodiments are possible as well (e.g., a digital signal processor).

For example, when the average CTWD 812 for the current layer is longer than expected based on the 3D model/robot parameters, this may be an indication that the resultant current layer is too short in height (e.g., not enough material was deposited to reach the designated height for this layer). Therefore, the duration and/or the WFS for the next operation can be increased to deposit more material for the next layer to compensate for the short height of the current layer.

Similarly, when the average CTWD for the current layer is shorter than expected, this may be an indication that the resultant current layer is too high (e.g., too much material was deposited, overshooting the designated height for this layer). Therefore, the duration and/or the WFS for the next operation can be decreased to deposit less material for the next layer to compensate for the current layer. In this manner, by allowing for a next layer to compensate for a current layer, any error in a resultant overall height of the workpiece part at a particular location, after all layers are generated, may be minimized. In accordance with an alternative embodiment, a travel speed of the gun may be adjusted (increased or decreased) for a next layer to help compensate for a current layer.

The relationship between duration (and/or wire feed speed), for a next layer, and average CTWD may be determined experimentally or through analysis based on theory, in accordance with various embodiments. In general, determination of CTWD is more accurate in a region that produces a larger amperage change for a given change in CTWD (e.g., see FIG. 5).

Figure 9:
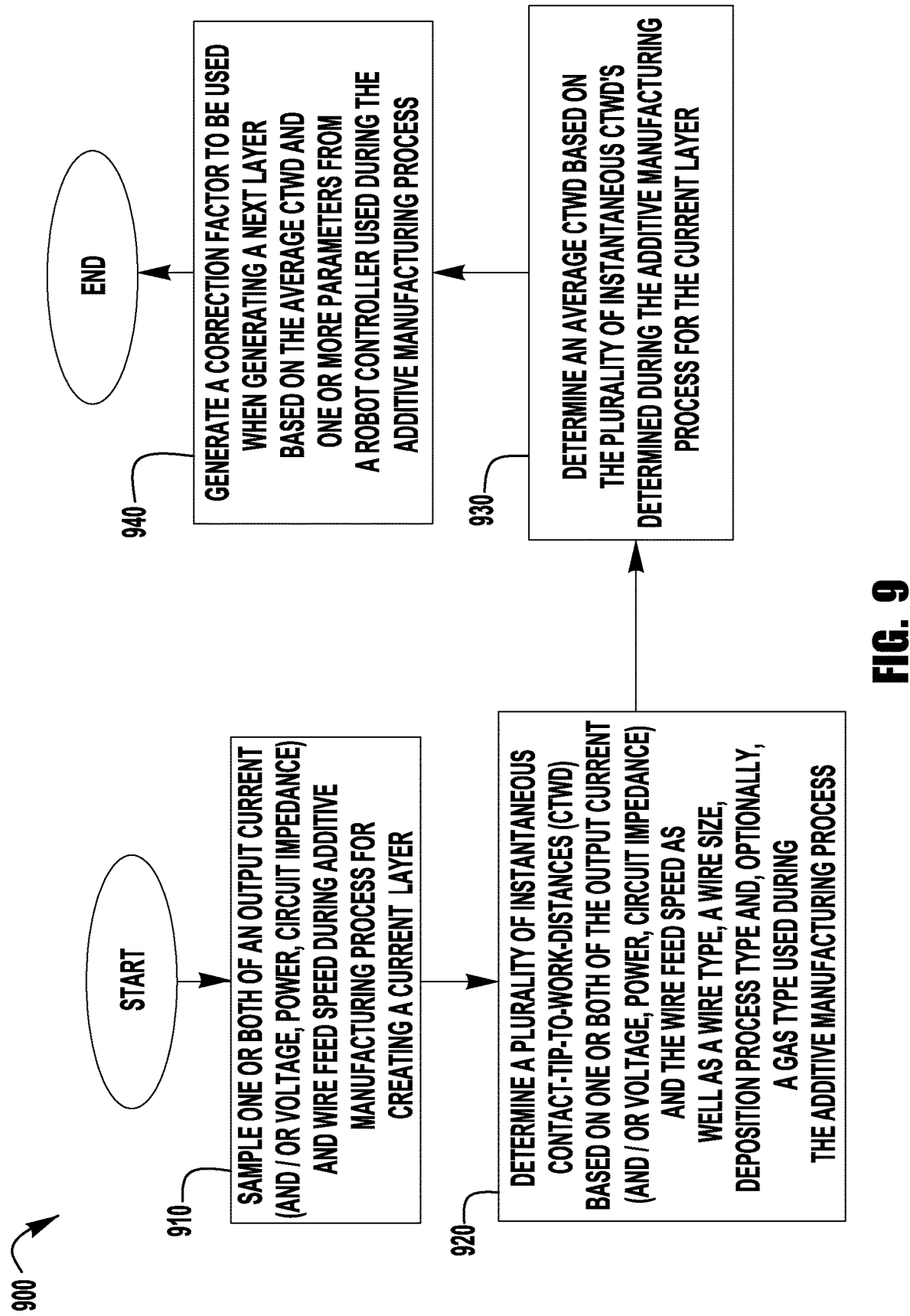
FIG. 9 illustrates a flow chart of an embodiment of a method for correcting for additive manufacturing height error on a layer-by-layer basis during an additive manufacturing process.

FIG. 9 illustrates a flow chart of an embodiment of a method 900 for correcting for additive manufacturing height error on a layer-by-layer basis during, for example, a robotic additive manufacturing process. It is noted that while FIG. 9 can refer to a welding process a similar process/method can be used for other processes such as cladding, hot-wire etc. Therefore, any references to "welding" with respect to this figure is intended to be exemplary and not limiting. Turning now to FIG. 9, in step 910, sample one or both of output current (and/or voltage, power, and circuit impedance) and wire feed speed during an additive manufacturing process for creating a current layer. In step 920, determine a plurality of instantaneous contact tip-to-work distances based on one or both of the output current (and/or voltage, power and impedance) and the wire feed speed, as well as a wire type, a wire size, deposition process type and, optionally, a gas type used during the additive manufacturing process. In step 930, determine an average CTWD based on the plurality of instantaneous CTWD's determined during the additive manufacturing process for the current layer. In step 940, generate a correction factor to be used when generating a next layer based on the average CTWD and one or more parameters from a robot controller used to control the robotic additive manufacturing/deposition process.

Figure 10:
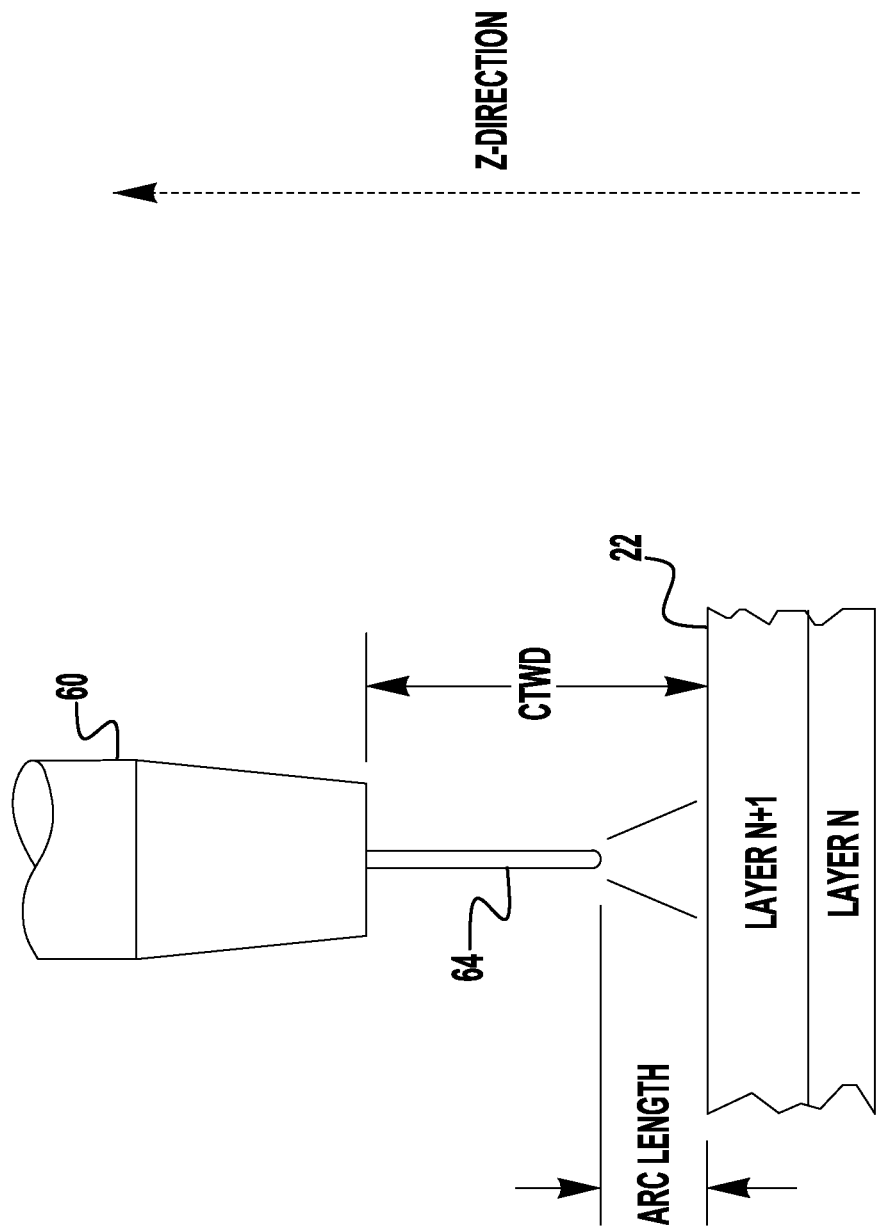
FIG. 10 illustrates an example of an additive manufacturing process employing the method of FIG. 9.

FIG. 10 illustrates an example of an additive manufacturing process employing the method 900 of FIG. 9, in which the process is an arc based process. In the process of FIG. 10, each layer of material is designated to be 50 mils in height along the z-direction at a designated position on a workpiece substrate, where a mil is a thousandth of an inch. During the deposit of each layer at the designated position, approximately ten (10) samples of instantaneous CTWD are determined as described herein during the duration for each layer. Furthermore, the average CTWD is determined from the ten (10) samples of instantaneous CTWD. In accordance with an embodiment, the correction factor for a layer may change or vary as the designated position across that layer changes.

In the example of FIG. 10, the average CTWD for layer N was determined to be longer than expected and the height of layer N ended up being 40 mils instead of the desired 50 mils. As a result, using the process described herein, a correction factor was determined for the next layer N+1 based on at least the average CTWD for layer N, where the duration and the wire feed speed were each increased by determined amounts to compensate for the height deficiency of layer N. As a result, the height of layer N+1 ended up being 60 mils, resulting in a total height of 100 mils from the bottom of layer N to the top of layer N+1, as desired. The process may proceed in a similar manner for all layers at the designated position, resulting in a minimized, acceptable error in height at that designated position. Again, in accordance with an embodiment, in addition (or as an alternative) to duration and wire feed speed, travel speed may be adjusted to compensate for the current layer. That is, any one or more of duration, wire feed speed, or travel speed for a next layer may be adjusted to compensate for a current layer.

As an alternative, a correction factor can be generated in real time for a current layer. For example, a running average of instantaneous CTWD's may be computed during a deposition process for a current layer. As the running average is monitored, adjustments may be made in the duration, the travel speed, the power source output, and/or the wire feed speed in real time for the current layer, based on the running average CTWD.

Figure 11:
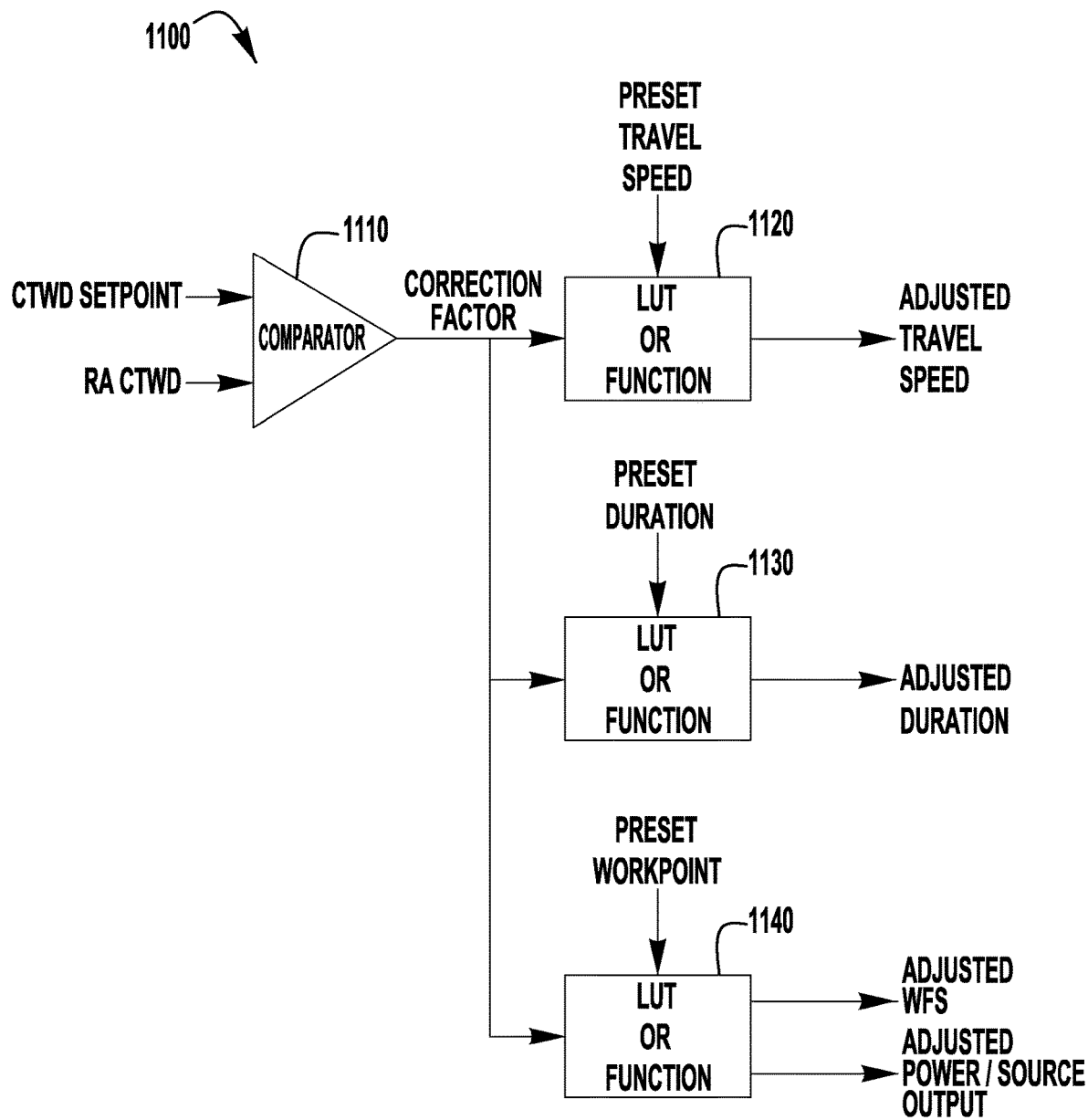
FIG. 11 illustrates an exemplary embodiment of a portion of the controller of the power source of FIG. 2 to compensate for deviations in a deposit level from a desired deposit level for a current layer.

FIG. 11 illustrates an exemplary embodiment of a portion 1100 of the controller 130 of the power source 72 (or system 10) of FIG. 2 to compensate for deviations in a deposit level (height) from a desired deposit level (desired height) for a current layer. As shown in FIG. 11, the portion 1100 of the controller 130 is configured to generate an adjusted travel speed, an adjusted duration, an adjusted wire feed speed (WFS), and an adjusted power source output for the current layer. In accordance with one embodiment, the controller 130 of the power source 72 communicates the adjusted travel speed to the robot controller 76 such that the robot controller 76 can drive the robot 14 to move the gun 60 at the adjusted travel speed. Similarly, the controller 130 of the power source 72 communicates the adjusted WFS to the wire feeder 68 such that the wire feeder 68 can drive the electrode (wire) at the adjusted WFS.

Referring again to FIG. 11, as the running average (RA) CTWD is being generated during deposition of a current layer, the running average CTWD is compared to a CTWD setpoint by a comparator 1110. The CTWD setpoint is a numerical value representing the desired CTWD. The output of the comparator 1110 is a correction factor. The correction factor may be a difference of the running average CTWD and the CTWD setpoint, in accordance with one embodiment. In accordance with another embodiment, the comparator 1110 may be replaced by a LUT (or function/algorithm executed by a processor) providing a relationship between the output (correction factor) and the inputs (RA CTWD and CTWD setpoint) that is more complex.

In accordance with on embodiment, the correction factor is input to three (3) LUT's (or functions/algorithms executed by a processor) 1120, 1130, and 1140. Also, a preset travel speed is input to the first LUT 1120, a preset duration is input to the second LUT 1130, and a preset workpoint is input to the third LUT 1140. In accordance with one embodiment, the preset workpoint includes a wire feed speed (WFS) and waveform parameters. The waveform parameters may include, for example, one or more of a peak voltage, a peak current, a power, a pulse duration, a background amplitude, or a frequency. The waveform parameters are configured to operate at the WFS, in accordance with one embodiment.

The output of the first LUT 1120 is an adjusted travel speed and the output of the second LUT 1130 is an adjusted duration. The output of the third LUT 1140 is an adjusted WFS and an adjusted power source output. The adjusted power source output may include, for example, one or more of an output voltage or an output current. The adjusted parameters compensate for deviations in a deposit level (height) from a desired deposit level (desired height) for the current layer at each of multiple positions as the current layer is being deposited. The relationship between the inputs and the outputs of the LUTs (or functions/algorithms executed by a processor) are determined experimentally or through analysis based on theory. The compensation is performed in real time at each location on the current layer.

In this manner, fine corrections of deposition may be achieved in real time for a current layer.

In accordance with another embodiment, a combination of the two approaches (i.e., making corrections in real time for the current layer and making corrections for a next layer based on the current layer) can be implemented. Such a combined approach may result in a combination of coarse correction and fine correction that helps to keep the height of the layers more consistent with each other. For example, in one embodiment, the approach of correcting, in real time, on the current layer may provide for fine corrections at many different positions on the current layer, and the approach of correcting on the next layer may provide a single coarse correction for the next layer. However, once the next layer becomes the current layer, fine correction may again be applied.

For example, in one embodiment, a system is provided having a power source 72. The power source 72 and/or controller 130 is configured to sample, in real time, instantaneous parameter pairs during a robotic additive manufacturing process while creating a current layer of a 3D workpiece part. Each instantaneous parameter pair of the instantaneous parameter pairs includes an output current, voltage, power or impedance and a wire feed speed. The power source 72 is also configured to determine an instantaneous contact tip-to-work distance in real time for, and based on at least, each parameter pair of the instantaneous parameter pairs as each parameter pair is sampled during creation of the current layer.

The power source 72 and/or controller 130 is further configured to determine, in real time, a running average contact tip-to-work distance based on each instantaneous contact tip-to-work distance as each instantaneous contact tip-to-work distance is determined during creation of the current layer. The power source 72 is also configured to determine a total average contact tip-to-work distance based on each instantaneous contact tip-to-work distance determined over the entire current layer. The total average contact tip-to-work distance may be a simple mathematical average of the instantaneous contact tip-to-work distances determined over the entire current layer or a weighted average of the instantaneous contact tip-to-work distances determined over the entire current layer.

The power source 72 and/or controller 130 is further configured to adjust, in real time, a duration, a travel speed, or a wire feed speed of the system during creation of the current layer in response to the running average contact tip-to-work distance. The power source and/or controller 130 is also configured to generate a correction factor to be used when creating a next layer of the 3D workpiece part based on at least the total average contact tip-to-work distance.

In accordance with one embodiment, the power source includes a controller 130 configured to determine the instantaneous contact tip-to-work distance, determine the running average contact tip-to-work distance, and determine the total average contact tip-to-work distance. The controller 130 is also configured to adjust one or more of the duration, the travel speed, or the wire feed speed during the creation of the current layer, and generate the correction factor to be used when creating the next layer. In one embodiment, the instantaneous contact tip-to-work distance is further based on one or more of an output voltage, an electrode type, an electrode diameter, a shielding gas used, a deposition process type, an output power and an output circuit impedance. Again, in other embodiments the controller 130 can be external to the power supply 72.

In one embodiment, adjusting the travel speed in response to the running average contact tip-to-work distance includes taking into account a preset travel speed. Adjusting the duration in response to the running average contact tip-to-work distance includes taking into account a preset duration. Adjusting the wire feed speed in response to the running average contact tip-to-work distance includes taking into account a preset wire feed speed.

In one embodiment, the system includes a robot 14 having a robot controller 76 configured to operatively communicate with the power source 72, a tool 60 operatively connected to the robot 14, and a wire feeder 68 operatively connected to the tool 60 and the power source 72. In one embodiment, the correction factor is further based on 3D model parameters corresponding to the 3D workpiece part and/or robot parameters provided by the robot controller 76 for a next operation for the next layer. The 3D model parameters and the robot parameters may include one or more of a designated height (designated deposition level) of the next layer or a designated position of a tool for the next layer.

In this manner, combined fine and coarse compensation for deposition levels can be accomplished for a current layer and a next layer, respectively, of a 3D workpiece part being additively manufactured.

Figure 12:
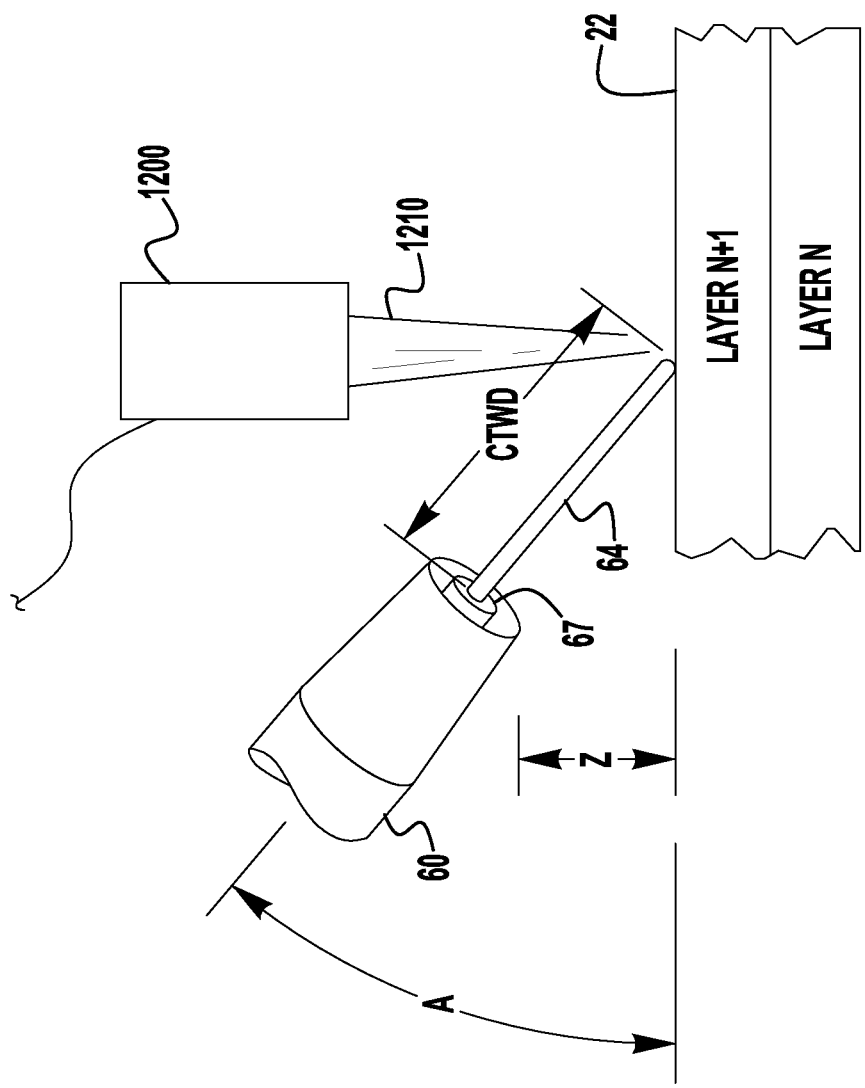
FIG. 12 illustrates an exemplary embodiment of a contact type deposition process of the present invention.

Turning now to FIG. 12, a further exemplary embodiment is shown. In this embodiment a contact-type deposition is process, such as with a hot-wire deposition process. The deposition process/system uses a high energy heat source, such as a laser 1200 to emit a beam 1210, or an electrode to emit an arc (not shown) to create a puddle on the surface of the workpiece 22. The arc can be generated the by the power source described herein. Further, the laser 1200 can be any laser known to provide sufficient energy density to create a puddle on the workpiece. The laser or power source can be used in the system described above regarding FIG. 1. Because the use, construction and operation or laser and arc based hot wire systems are known they need not be described in detail herein. Like that described in FIG. 4a, the consumable 64 is passed through a contact tip 67 in a gun 60 and directed to the puddle (not shown) where the consumable is deposited. In exemplary embodiments the heat source (beam or arc) is in-line with the consumable 64—in the travel direction—as well as close to perpendicular to the surface of the workpiece 22. However, in other exemplary embodiments, as shown in FIG. 12, the centerline of the consumable 64 is angled at an angle A to the work surface of the workpiece 22. In exemplary embodiments, the angle A is in the range of 10 to 75 degrees, while in other exemplary embodiments, the angle A is in the range of 25 to 60 degrees. Further, while in some embodiments the consumable is in-line—in the travel direction of the heat source—in other exemplary embodiments the consumable is off to the side of the heat source—in the travel direction—as shown in FIG. 12. By angling the consumable as described herein and/or positioning the consumable to the side of the heat source a longer CTWD can be achieved for a given height Z. This longer stick out is due to the geometry of the configuration, where the CTWD is the hypotenuse of a right triangle having the sides Z and the workpiece surface. That is, as the distance Z changes (as described above) a given distance, the CTWD change will be larger in scale—thus creating a larger feedback signal for improved feedback control. Therefore, embodiments like this provided above can provide improved precision height control. This results in improved operational performance, particularly in operations having a relatively low output current or power.

In one embodiment, a system is provided having a power source. The power source is configured to: sample, in real time, instantaneous parameter pairs of output current, voltage, power or circuit impedance and wire feed speed during a robotic additive manufacturing process for creating a current layer of a 3D workpiece part; determine an instantaneous contact tip-to-work distance for, and based on at least, each parameter pair of the instantaneous parameter pairs sampled during creation of the current layer; determine an average contact tip-to-work distance based on each instantaneous contact tip-to-work distance determined for the current layer; and generate a correction factor to be used when creating a next layer of the 3D workpiece part based on at least the average contact tip-to-work distance. Each instantaneous contact tip-to-work distance may be determined in real time, and the power source may be further configured to: determine, in real time, a running average of contact tip-to-work distance as each instantaneous contact tip-to-work distance is determined during creation of the current layer; and adjust, in real time, one or more of a duration or a wire feed speed during creation of the current layer in response to the running average of contact tip-to-work distance. The instantaneous contact tip-to-work distance may be further based on one or more of output voltage, output power, output circuit impedance, electrode type, electrode diameter, shielding gas used and deposition process type. The correction factor may affect one or more of duration, wire feed speed, or travel speed for the next layer. The correction factor may be further based on one or more of 3D model parameters corresponding to the 3D workpiece part or robot parameters provided by a robot controller for a next operation for the next layer. The 3D model parameters and robot parameters may include one or more of a designated height of the next layer or a designated position of a tool for the next layer. The average contact tip-to-work distance may be one of a simple mathematical average of the instantaneous contact tip-to-work distances determined for the current layer, a weighted average of the instantaneous contact tip-to-work distances determined for the current layer, or a running average of the instantaneous contact tip-to-work distances determined for the current layer. The system may include a robot having a robot controller configured to operatively communicate with the power source. The system may include a tool operatively connected to the robot. The system may include a wire feeder operatively connected to the tool and the power source.

In one embodiment, a system is provided having a power source. The power source is configured to: sample, in real time, instantaneous parameter pairs of output current and wire feed speed during a robotic additive manufacturing process for creating a current layer of a 3D workpiece part; determine, in real time, an instantaneous contact tip-to-work distance for, and based on at least, each parameter pair of the instantaneous parameter pairs sampled during creation of the current layer; determine, in real time, a running average of contact tip-to-work distance as each instantaneous contact tip-to-work distance is determined during creation of the current layer; and adjust, in real time, one or more of a duration or a wire feed speed during creation of the current layer in response to the running average of contact tip-to-work distance. The power source may be further configured to: determine an average contact tip-to-work distance based on each instantaneous contact tip-to-work distance determined for the current layer; and generate a correction factor to be used when creating a next layer of the 3D workpiece part based on at least the average contact tip-to-work distance. The instantaneous contact tip-to-work distance may be further based on one or more of output voltage, output power, output circuit impedance, an electrode type, an electrode diameter, shielding gas used, and deposition process type. The correction factor may affect one or more of duration, wire feed speed, or travel speed for the next layer. The correction factor may be further based on one or more of 3D model parameters corresponding to the 3D workpiece part or robot parameters provided by a robot controller for a next operation for the next layer. The 3D model parameters and robot parameters may include one or more of a designated height of the next layer or a designated position of a tool for the next layer. The system may include a robot having a robot controller configured to operatively communicate with the power source. The system may further include a tool operatively connected to the robot. The system may also include a wire feeder operatively connected to the tool and the power source.

In summary, a system and method to correct for height error during an additive manufacturing process are provided. One or both of an output current, output voltage, output power, output circuit impedance and a wire feed speed are sampled during a robotic additive manufacturing process when creating a current layer. A plurality of instantaneous contact tip-to-work distances (CTWD's) are determined based on at least one or both of the output current, output voltage, output power, output circuit impedance and the wire feed speed. An average CTWD is determined based on the plurality of instantaneous CTWD's. A correction factor is generated, based on at least the average CTWD, which is used to compensate for any error in height of the current layer and/or the next layer.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. § 112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. An additive manufacturing system, comprising:
   a power source; and
   a material feeder that provides additive material to a 3D workpiece part via a contact tip of a gun,
   wherein the power source is configured to:
   sample instantaneous parameter pairs, where each instantaneous parameter pair of the instantaneous parameter pairs includes any two parameters selected from a group comprising a wire feed speed of a wire that provides the additive material to the 3D workpiece part, an output power of the power source, and an output circuit impedance of the power source, during a robotic additive manufacturing process while creating a current layer of the 3D workpiece part;
   determine an instantaneous contact tip-to-work distance during the robotic additive manufacturing process for, and based on at least, each parameter pair of the instantaneous parameter pairs as each parameter pair is sampled during the creation of the current layer;
   determine a running average contact tip-to-work distance based on each instantaneous contact tip-to-work distance as each instantaneous contact tip-to-work distance is determined during the creation of the current layer; and
   generate a correction factor, based on at least the running average contact tip-to-work distance, to be used while creating the current layer of the 3D workpiece part to compensate for deviations in a deposit level from a desired deposit level for the current layer.

2. The additive manufacturing system of claim 1, wherein the two parameters includes a first parameter that is the wire feed speed and a second parameter that is the output power of the power source or the output circuit impedance of the power source.

3. The additive manufacturing system of claim 2, wherein the instantaneous contact tip-to-work distance is further based at least one of a type of hot-wire, a hot-wire diameter, a deposition process, or a shielding gas used in the robotic additive manufacturing process.

4. The additive manufacturing system of claim 1, wherein the robotic additive manufacturing process includes a hot-wire process using the wire.

5. The additive manufacturing system of claim 4, wherein the power source includes a high energy heat source, and the creating of the current layer of the 3D workpiece part includes providing sufficient energy density to the 3D workpiece part to create a puddle, and
   wherein the wire enters the puddle during the creating of the current layer.

6. The additive manufacturing system of claim 5, wherein an angle of a centerline of the wire as the wire enters the puddle with respect to a surface of the puddle is in a range of 10 degrees to 75 degrees.

7. The additive manufacturing system of claim 1, wherein the running average contact tip-to-work distance is one of a simple running mathematical average of the instantaneous contact tip-to-work distances or a weighted running average of the instantaneous contact tip-to-work distances.

8. The additive manufacturing system of claim 1, wherein the power source is further configured to:
generate the correction factor at least in part by comparing the running average contact tip-to-work distance to a setpoint contact tip-to-work distance; and
adjust at least one of a travel speed, a duration, or the wire feed speed during creation of the current layer in response to the correction factor.

9. The additive manufacturing system of claim 8, wherein:
the adjusting the travel speed in response to the correction factor includes taking into account a preset travel speed;
the adjusting the duration in response to the correction factor includes taking into account a preset duration; and
the adjusting the wire feed speed in response to the correction factor includes taking into account a preset wire feed speed.

10. The additive manufacturing system of claim 1, wherein the correction factor is further based on at least one 3D model parameter corresponding to the 3D workpiece part or at least one robot parameter provided by a robot controller for a current operation for the current layer.

11. The additive manufacturing system of claim 10 wherein the at least one 3D model parameter includes a designated height of the current layer and the at least one robot parameter includes a designated position of the gun for the current layer.

12. The additive manufacturing system of claim 1, further comprising a robot having a robot controller configured to operatively communicate with the power source.

13. The additive manufacturing system of claim 12, the gun is operatively connected to the robot.

14. The additive manufacturing system of claim 13, further comprising a wire feeder operatively connected to the gun and the power source.

15. The additive manufacturing system of claim 1, wherein the power source is further configured to:
determine a total average contact tip-to-work distance based on each instantaneous contact tip-to-work distance determined over an entire current layer;
adjust at least one of a deposit duration, a travel speed, or the wire feed speed of the additive manufacturing system during creation of the current layer in response to the running average contact tip-to-work distance; and
generate a correction factor to be used when creating a next layer of the 3D workpiece part based on at least the total average contact tip-to-work distance.

16. The additive manufacturing system of claim 15, wherein the power source includes a controller, and wherein the controller is configured to:
determine the instantaneous contact tip-to-work distance;
determine the running average contact tip-to-work distance;
determine the total average contact tip-to-work distance;
adjust at least one of the deposit duration, the travel speed, or the wire feed speed during the creation of the current layer; and
generate the correction factor to be used when creating the next layer.

17. A method of additive manufacturing using a power source and a material feeder that provides additive material to a 3D workpiece part via a contact tip of a gun, the method comprising:
sampling instantaneous parameter pairs, where each instantaneous parameter pair of the instantaneous parameter pairs includes any two parameters selected from a group comprising a wire feed speed of a wire that provides the additive material to the 3D workpiece part, an output power of the power source, and an output circuit impedance of the power source, during a robotic additive manufacturing process while creating a current layer of the 3D workpiece part;
determining an instantaneous contact tip-to-work distance during the robotic additive manufacturing process for, and based on at least, each parameter pair of the instantaneous parameter pairs as each parameter pair is sampled during the creation of the current layer;
determining a running average contact tip-to-work distance based on each instantaneous contact tip-to-work distance as each instantaneous contact tip-to-work distance is determined during the creation of the current layer; and
generating a correction factor, based on at least the running average contact tip-to-work distance, to be used while creating the current layer of the 3D workpiece part to compensate for deviations in a deposit level from a desired deposit level for the current layer.

18. The method of claim 17, wherein the two parameters includes a first parameter that is the wire feed speed and a second parameter that is the output power of the power source or the output circuit impedance of the power source.

19. The method of claim 18, wherein the instantaneous contact tip-to-work distance is further based at least one of a type of hot-wire, a hot-wire diameter, a deposition process, or a shielding gas used in the robotic additive manufacturing process.

20. The method of claim 17, wherein the robotic additive manufacturing process includes a hot-wire process using the wire.

21. The method of claim 20, wherein the creating of the current layer of the 3D workpiece part includes providing sufficient energy density from a high-energy beam to the 3D workpiece part to create a puddle, and
wherein the wire enters the puddle during the creating of the current layer.

22. The additive manufacturing system of claim 21, wherein an angle of a centerline of the wire as the wire enters the puddle with respect to a surface of the puddle is in a range of 10 degrees to 75 degrees.

23. The method of claim 17, wherein the running average contact tip-to-work distance is one of a simple running mathematical average of the instantaneous contact tip-to-work distances or a weighted running average of the instantaneous contact tip-to-work distances.

24. The method of claim 17, wherein the method further comprises:
generating the correction factor at least in part by comparing the running average contact tip-to-work distance to a setpoint contact tip-to-work distance; and adjusting at least one of a travel speed, a duration, or the wire feed speed during creation of the current layer in response to the correction factor.

25. The method of claim 24, wherein:
the adjusting the travel speed in response to the correction factor includes taking into account a preset travel speed;
the adjusting the duration in response to the correction factor includes taking into account a preset duration; and
the adjusting the wire feed speed in response to the correction factor includes taking into account a preset wire feed speed.

26. The method of claim 17, wherein the correction factor is further based on at least one 3D model parameter corresponding to the 3D workpiece part or at least one robot parameter provided by a robot controller for a current operation for the current layer.

27. The method of claim 26, wherein the at least one 3D model parameter includes a designated height of the current layer and the at least one robot parameter includes a designated position of the gun for the current layer.

28. The method of claim 17, further comprising:
determining a total average contact tip-to-work distance based on each instantaneous contact tip-to-work distance determined over an entire current layer;
adjusting at least one of a deposit duration, a travel speed, or the wire feed speed during creation of the current layer in response to the running average contact tip-to-work distance; and
generating a correction factor to be used when creating a next layer of the 3D workpiece part based on at least the total average contact tip-to-work distance.

* * * * *